United States Patent [19]
Kelly, III

[11] Patent Number: 4,811,255
[45] Date of Patent: Mar. 7, 1989

[54] TACHOMETER, RPM PROCESSOR, AND METHOD

[75] Inventor: Tom J. Kelly, III, Huntington Beach, Calif.

[73] Assignee: Horizon Instruments, Inc., Fullerton, Calif.

[21] Appl. No.: 842,801

[22] Filed: Mar. 21, 1986

[51] Int. Cl.$^4$ .................. G06F 15/20; G01P 3/60; G01P 3/54
[52] U.S. Cl. .................. 364/565; 123/351; 324/164; 324/179
[58] Field of Search .............. 324/164, 167, 173, 179; 73/35; 123/198 D, 198 C, 351; 364/565

[56] References Cited

U.S. PATENT DOCUMENTS

| | | | |
|---|---|---|---|
| 4,091,656 | 5/1978 | Altemose, Jr. | 73/35 |
| 4,274,142 | 6/1981 | Furuhashi et al. | 364/565 |
| 4,281,388 | 7/1981 | Friend et al. | 364/565 |
| 4,371,935 | 2/1983 | Yamaki | 364/565 X |
| 4,492,197 | 1/1985 | Yamamoto et al. | 123/198 DC X |
| 4,535,288 | 8/1985 | Vitulli, Jr. | 364/565 X |
| 4,578,755 | 3/1986 | Quinn et al. | 364/565 X |
| 4,594,978 | 6/1986 | Kanno | 123/198 DC X |

OTHER PUBLICATIONS

"Flying" by Barry Schiff; Golden Press, New York, Western Publishing Company, Inc. 1971; pp. 1-3 & 27-28.
"Seneca Information Manual" by Piper: Publications Department Piper Aircraft Corporation. 4/71, Revised 11/71. pp. 1-4 & 2-13.

*Primary Examiner*—Parshotam S. Lall
*Assistant Examiner*—Edward R. Cosimono
*Attorney, Agent, or Firm*—W. G. Caldwell; J. F. Kirk

[57] ABSTRACT

The invention comprises a tachometer for aircraft for determining engine operating parameters from magneto signals from right and left magnetos. A signal conditioning circuit receives ignition signals from at least one magneto and modifies the ignition signals to provide a right and left train of input pulses for the microprocessor. The microprocessor follows a stored program to develop filtered quantitites depicting right rpm, and left rpm for respective right and left engines, or right and left magnetos of a single engine. The maximum rpm achieved during operation is also stored, along with the difference between the right and left rpms, the change in rpm over a period of time, and average rpm of two engines. A mode switch selects from right rpm, left rpm, maximum rpm, difference rpm, change in rpm over time, and average rpm for display on the display means. A method for calculating highly accurate engine RPM is disclosed. The displayed information is used by the aircraft mechanic and/or pilot to diagnose aircraft engine and instrument performance.

4 Claims, 21 Drawing Sheets

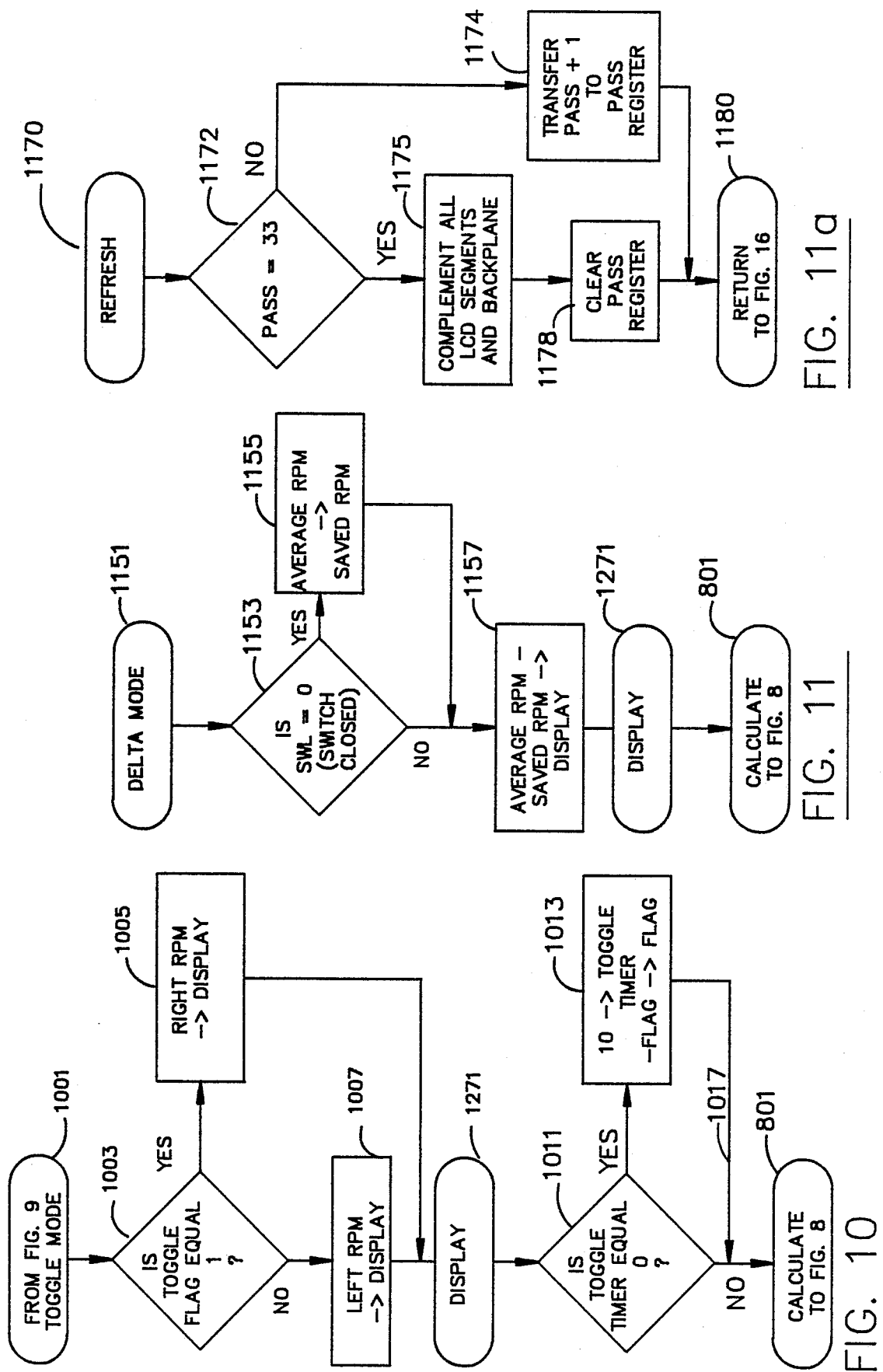

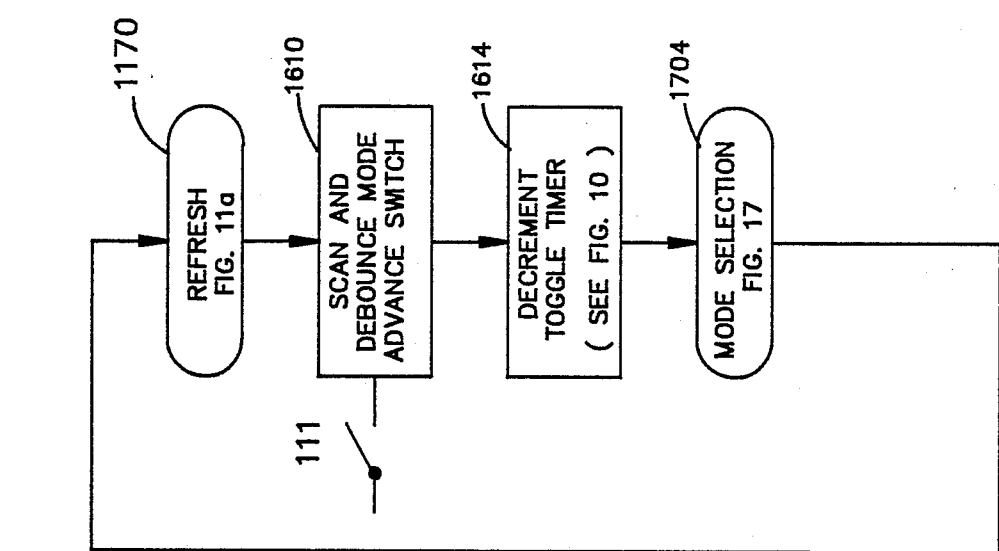
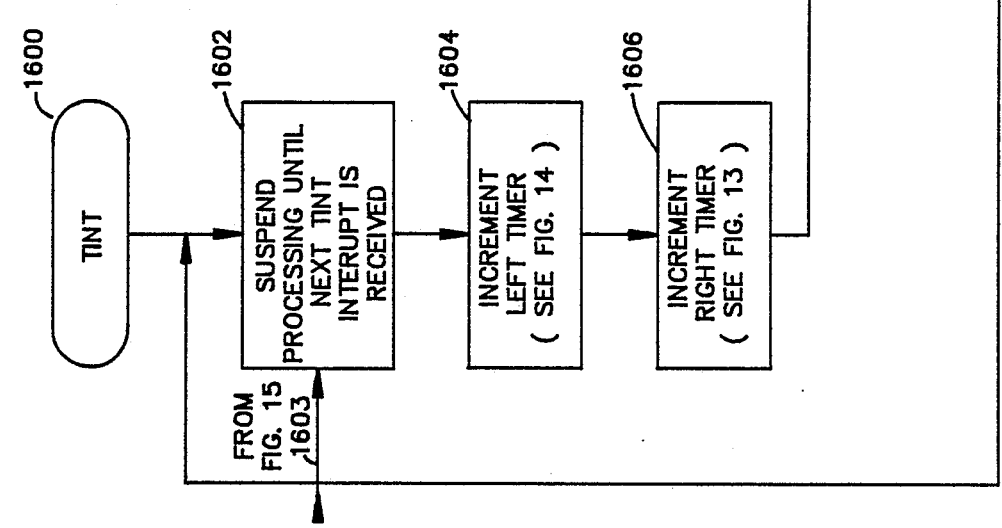
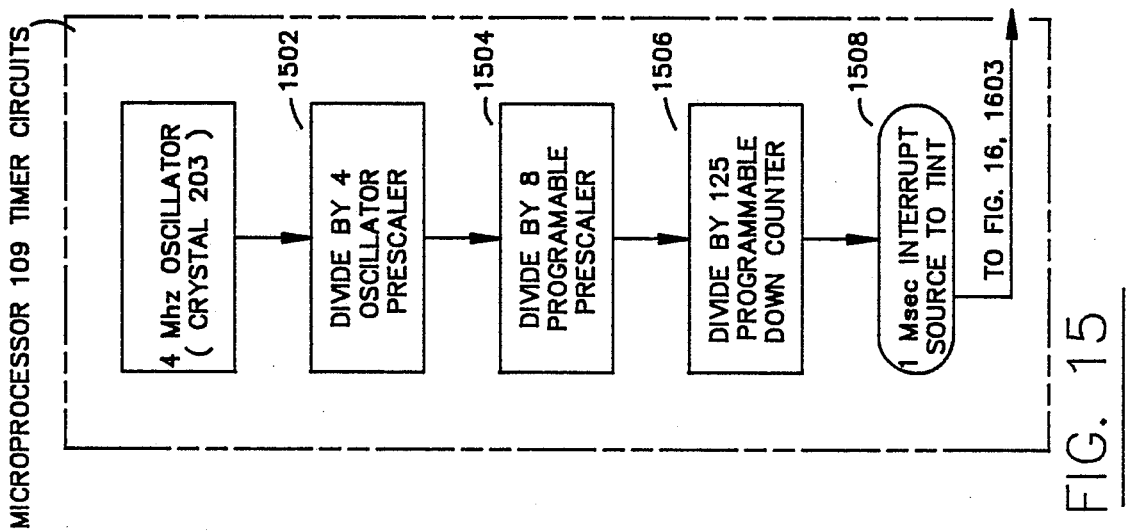
FIG. 16
FIG. 15

TACHOMETER, RPM PROCESSOR, AND METHOD

FIELD OF THE INVENTION

The invention processes and stores engine information, such as the number of cylinder firings per determined length of time to selectively display RPM readings for determining engine RPM performance, RPM change, maximum RPM attained, and the like.

BACKGROUND OF THE INVENTION

While the invention is applicable to most engines employing electrical pulses for firing spark plugs, as well as other engines where transducers detect cylinder ignition in the absence of an electrical signal, such as in the case of diesel engines, never-the-less it will be explained in respect to its application to both single and multiple engine aircraft.

The aircraft tachometer is in most cases, the only indication of engine performance in the cockpit. Loss of an operational tachometer can severely impair the pilot's ability to operate the aircraft safely. Prior art aircraft tachometers exibit several undesireable qualities:

They may lack sufficient display precision to supply diagnostic information to the pilot during pre-flight check out;

They provide little other diagnostic information to the pilot;

They are mechanical devices, mechanically connected to the aircraft's engines;

They exhibit linearity error as RPM increases over the operating range of the device;

They are prone to mechanical aging and failure;

They provide no alternate or redundant source of RPM in case of failure of the cable or connecting assemblies.

These older mechanical tachometers typically employ a rotating cable, within a cable housing, that connects the engine to the tachometer. Failure of the cable, its oil seals, gearing, or housing can be catastrophic to the pilot as well as expensive to fix or repair.

An electronic tachometer is able to overcome all of the above mentioned problems, delivering its RPM information in a more accurate numeric display instead of the traditional analog dial-type display.

In addition, an electronic tachometer can provide the pilot additional information regarding the operation of his aircraft more reliably and at a lower overall cost.

Pilots flying twin engine aircraft have an additional need for an electronic tachometer. The tachometer can calculate RPM information from both engines simultaneously and inform the PILOT of the difference so that adjustments can be made to exactly match the two engine's RPM.

Additionally, aircraft applications require at least three significant digits of RPM to be displayed verses the normal two significant digits found on automotive digital tachometers. The problem of achieving this additional accuracy was overcome by devising a method and apparatus to minimize the errors in sampling the firing pulses received from the engine's magnetos.

Typical electronic tachometers will simply count the number of firing pulses received during a fixed period of time, usually ⅛ to ¼ second to keep the display frequently updated. This method cannot account for the time from the beginning of the sampling period until the first counted firing pulse and the time to the end of the sampling period from the last counted firing pulse. These two time periods represent un-determined fractions of firing pulse periods that cause significant error at lower RPM operation.

An alternate method is to measure the duration of one firing period between consecutive firing pulses. Knowing the units of time this measurement is made in and the number of cylinders in the engine will allow calculation of RPM. The method is simple to implement in a microprocessor but fails in accuracy at higher RPM unless an extremely accurate timer is available to measure the firing period. An example is that as little as 1.2 microseconds need be measured to determine between 5000 and 4999 RPM. This method is not practical for low cost applications and its accuracy will also suffer from slight external mechanical variations, such as engine or magneto wear, bearing wobble, cylinder compression differences, fouled plugs or bad ignition wires.

The solution is to count cylinder firings for at least a pre-determined amount of time that is synchronized with the first pulse counted and optionally extended to the next pulse immediately following (or co-incident with) the end of the pre-determined time. This yields an integer number of firing pulses counted during the sample period, eliminating the error of the first method, and does not require a high precision timer. The timers currently existing within the selected microprocessor will suffice for this job.

SUMMARY OF THE INVENTION

In applications using magnetos, electrical pulses are produced as the breaker points open (or corresponding pulses on coils on engines without magnetos or from transducers such as HALL EFFECT DEVICES, ACOUSTIC TRANSDUCERS, or shaft revolution counters) providing the necessary indications of engine cylinder firings that are used to determine engine RPM.

The invention provides a tachometer and a method for use with at least one engine having at least one magneto and at least one cylinder. Signal Processing Means are provided for deriving digital electrical pulses from the magneto corresponding in time to the firing of each cylinder by its corresponding magneto. In most private aircraft, a wire is brought to a cockpit control panel from each magneto of each engine. These wires permit the low voltage coil of the magneto to be shorted to ground while the aircraft is performing its preflight checks to determine the condition of the other magneto on each engine tested. The tachometer of the invention makes use of these wires to derive raw magneto pulses for processing in the signal processing circuits preparatory to feeding digital pulses to the microprocessor.

Further means determine a respective sampling period for each magneto; each period being synchronized with the firing of a cylinder by its respective magneto pulse and including at least a predetermined amount of time in each sampling period.

This pre-determined amount of time is typically ¼ second for aircraft engines. A period of this length will permit frequent display updates while maintaining accuracy to 250 RPM.

As the pre-determined time expires, the tachometer waits for the next pulse from the ignition system, thereby extending the time and measuring it for an integer number of firing pulses. The measured time interval is the sum of the pre-determined time, plus the time required for the next successive firing pulse.

Means are provided for the calculation of RPM from the sampling period and sampled firing pulse count. RPM is continuously calculated from the on-going sampling process. The digital display may be updated as many as four times a second.

Means are provided allowing the invention to simultaneously and asynchronously derive RPM from more than one signal source, effectively allowing the singular device to function as two independent tachometers.

Additional means are provided allowing calculations to be made based upon calculated RPM information; allowing safer, more reliable and easier use of the aircraft. Examples of more desirable calculations available:

Determining failure of a monitored magneto

Determine average RPM between two engines

Determine the change in engine RPM over a period of time

Determining the difference in RPM of two engines

Determining and recording the maximum RPM achieved by an engine.

A mode advance switch is provided to permit the pilot to select any of the above information for display. The tachometer is preferably a hand held flat box with mode advance selector switch available as a timed push button to permit one hand operation while using the other hand for flying. The hand operated switch is responsive to a five second timer and to a ten to fifteen second timer. If the pilot depresses the switch for a period longer than five seconds, operation remains in a single mode indicated by the liquid crystal display's anunciators for ten to fifteen seconds such that the pilot may observe the display for the information available in that mode. By operating the switch successively in less than five seconds, the switch advances the modes until the liquid crystal display's annunciators indicate that the desired mode has been obtained. After ten to fifteeen seconds in that mode, mode selection is again available. Six or seven modes are thus available at the touch of a button.

Operation is the same on the ground for individual magneto checks of right and left RPM for single or multiple engines. Another feature of the invention resides in the use of it as a diagnostic instrument for maintenance work.

For the CYLINDER SELECT mode, the MAXIMUM RPM mode, and the DELTA RPM mode, once the mode has been selected the mode advance switch is used for further operation of the selected mode as long as the mode remains selected.

BRIEF DESCRIPTION OF THE DRAWINGS

FIG. 10 is a flow chart for alternately displaying Right and Left RPM;

FIG. 11 is a flow diagram for displaying change in RPM;

FIG. 11a is a flow diagram for refreshing the liquid crystal display;

FIG. 15 is a block diagram of the timer circuits included within the microprocessor that provides an interrupt to the microprocessor every millisecond;

FIG. 16 is a flow diagram of the response to the millisecond interrupt indicated in FIG. 15, providing timing information to other subroutines of the microprocessor's program;

PREFERRED EMBODIMENT

The preferred embodiment of the invention tachometer is it's use as an aircraft tachometer. It derives RPM timing information from aircraft engine magnetos. It is able to monitor at least two magnetos simultaneously, both magnetos not necessarily connected to the same engine.

Figure 5:
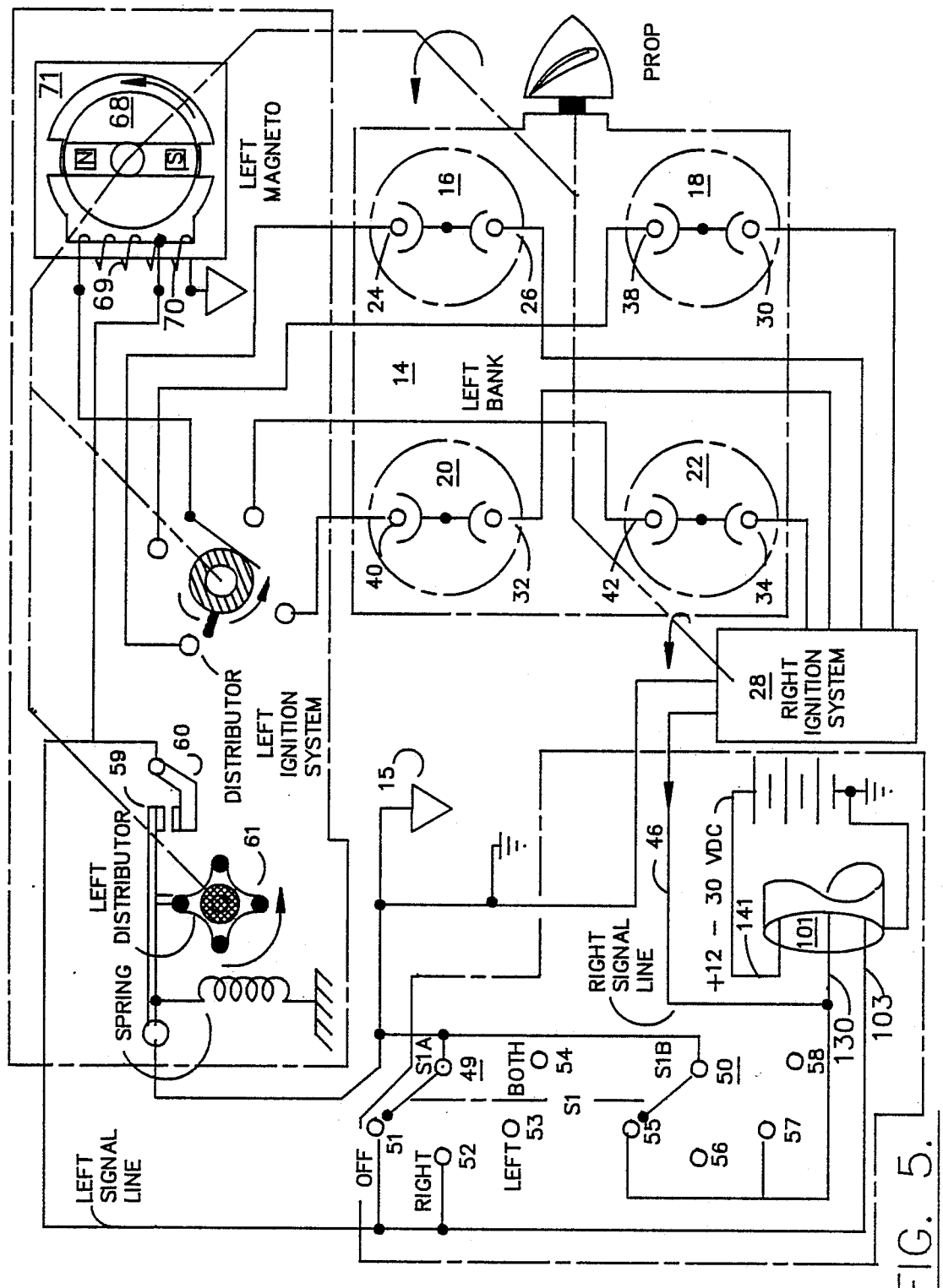
FIG. 5 is a schematic of an aircraft dual magneto ignition system, the LEFT MAGNETO and its associated circuitry being shown in detail, for developing cylinder firing pulses.

Typical conventional small aircraft engines include two magneto ignition systems, FIG. 5, to back each other up in case of failure. If either magneto fails, the other will continue to operate the engine at safe performance levels. Magneto ignition systems are preferred in aircraft because they are self-contained and do not rely upon extenal battery or generator power to operate.

The single engine application of the invention tachometer connects the tachometer to each of the two magnetos allowing RPM information to be sampled from either magneto. This provides a backup or redundant source of RPM information in case either magneto fails, and an indication of which magneto failed.

The twin engine application has one input of the invention tachometer connected to one magneto on each engine. This allows the invention tachometer to display RPM from each engine to the pilot. The various modes of operation of the tachometer allow the pilot to determine engine and throttle synchronization for twin engine aircraft as well as engine RPM.

In accordance with the present invention, FIG. 5 is a combined schematic and block diagram of a dual ignition system coupled to the invention tachometer (FIG. 1, etc.) via cable 101. This particular application shows the invention circuit coupled to a reciprocating internal combustion engine depicted within block 14 having a predetermined number of cylinders.

The engine, 14, by way of example only is shown as having four cylinders represented by phantom circles 16, 18, 20 and 22. The invention tachometer input circuit is easily coupled via a three conductor shielded cable, such as cable 101 having battery lead 141, left signal lead 103 and right signal lead 130 to operate with dual ignition systems used on engines having from six, eight or even higher numbers of cylinders, and with engines having odd as well as even numbers of cylinders.

FIG. 5 depicts each cylinder as having a left and right spark plug such as 24 and 26 respectively. A right ignition system represented by functional block 28 provides ignition firing signals to each respective right spark plug 26, 30, 32 and 34 in a predetermined sequence.

A left ignition system, represented by the remaining portion of the schematic circuit within provides ignition firing signals to each respective left spark plug 24, 38, 40, and 42 in a predetermined sequence.

Figure 3:
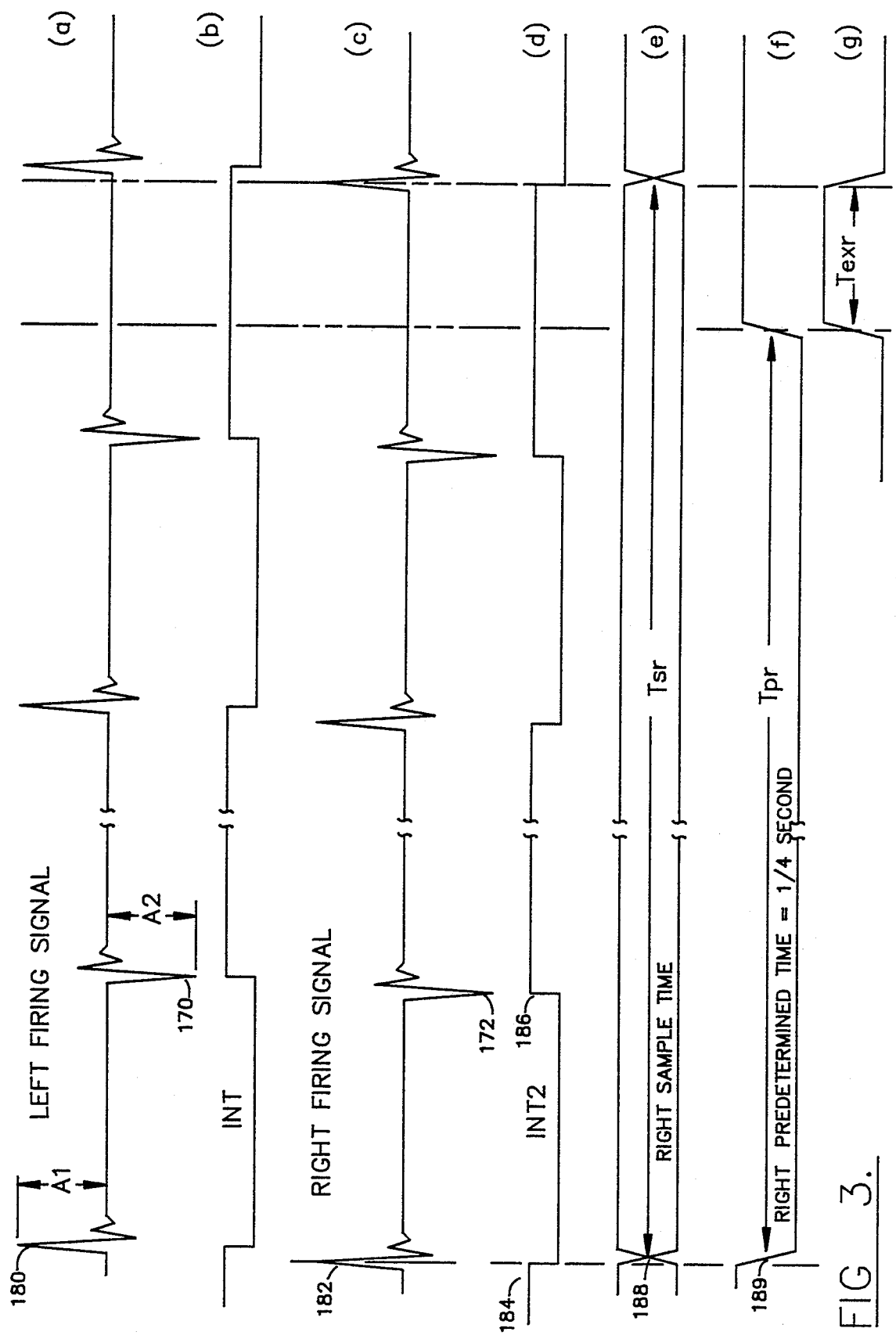
FIG. 3 is a timing diagram of the relationship between the incoming right firing pulses from the magneto, the resulting digital pulses, the pre-determined sample time and the extension of the sample time including the next encountered firing pulse.

The left ignition system left signal line 103 provides a left attenuated ignition signal, such as that shown in FIG. 3, as the waveform (a). The right ignition system right signal line 130 provides a right attenuated ignition signal, such as that shown in FIG. 3 as waveform (c).

Figure 4:
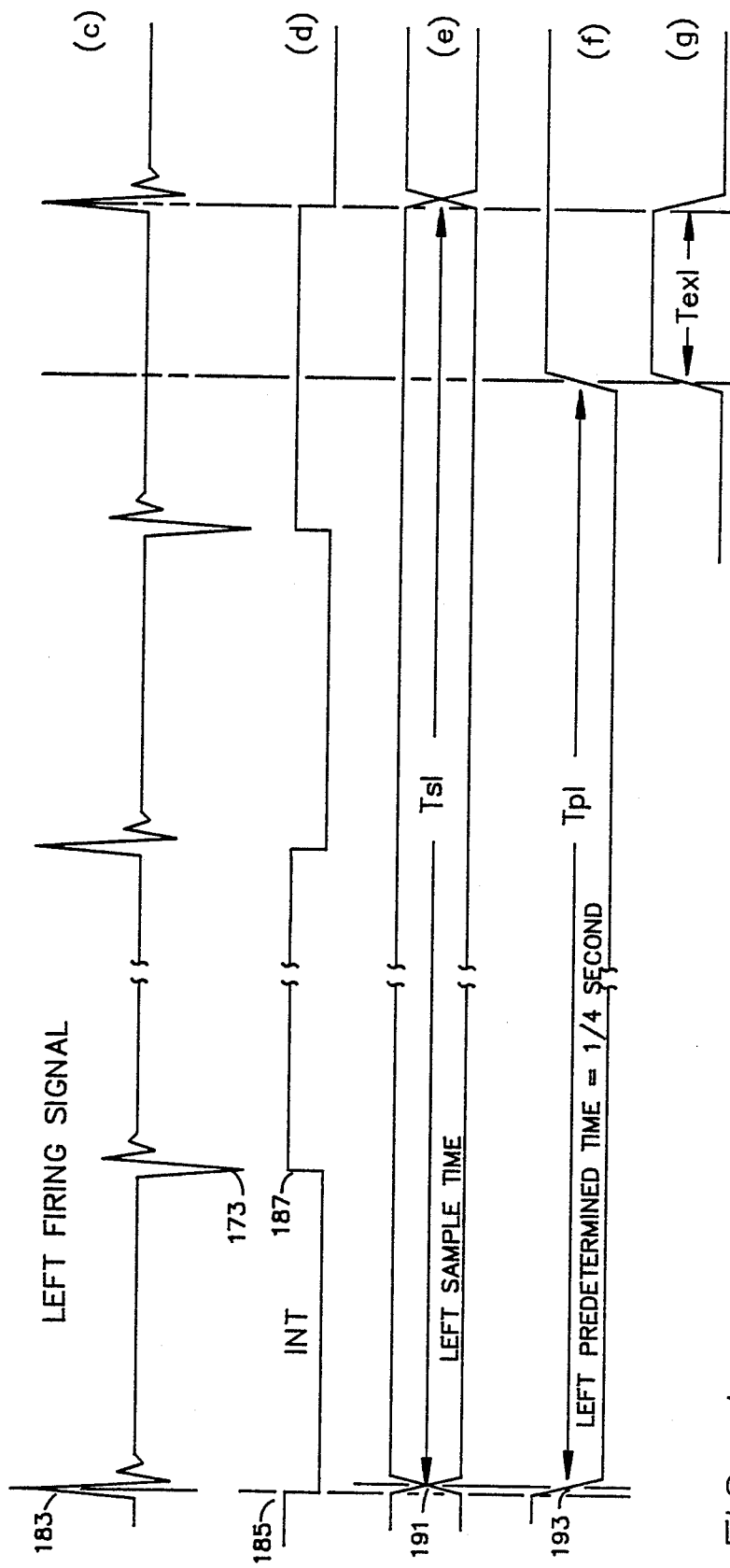
FIG. 4 is a timing diagram of the relationship between the incoming left firing pulses from the magneto, the resulting digital pulses, the pre-determined sample time and the extension of the sample time including the next encountered firing pulse.

The attenuated left ignition signals, such as those shown as waveforms (a) of FIG. 3 and (c) of FIG. 4 and the attenuated right ignition signals, such as those shown as waveforms (c) of FIG. 3 form a recurrent series of relatively concurrent left and right attenuated ignition signal pairs.

Each respective left and right attenuated ignition signal of FIG. 3, such as signals 180 and 182, correspond to the ignition firing signal (not shown) applied to the respective engine spark plugs, such as those referenced in FIG. 5 as 40 and 32, respectively. The left and right attenuated ignition signals are typically 50 to 100 times smaller in amplitude that their corresponding ignition firing signals.

The left magneto is mechanically driven by the engine 14. A magnet 68 rotates, providing a moving field that cuts the coils 69, 70 of the magneto. The left distributor contacts 59, 60 remain closed, shorting the low voltage winding 70 of the left magneto until firing time at which time the points 59, 60 break open. During the interval proceeding the opening of the points, the moving field produces a large circulating current in the shorted low voltage winding 70 and a correspondingly high magnetic intensity in the core 71 of the magneto.

As the points begin to open, the magnetic circuit of the magneto develops voltage on the low voltage winding 70 sufficient to maintain the ampere turn product in the winding to support the flux in the core 71. As voltage developes across the low voltage winding 70, a correspondingly higher voltage develops across the magneto high voltage winding 69.

The turns ratio of the high voltage winding 69 to the low voltage winding 70 is typically 100 to 1 or greater. The distributor is synchronized with the crankshaft to direct the signal from the magneto high voltage winding 69 to the correct spark plug as the points open. As the voltage to the spark plug reaches 12 to 18 thousand volts, it ionizes the air-fuel mixture between the electrodes of the spark plug, reducing the resistance of the spark gap and allowing the electrons to flow across the spark gap, creating a spark.

The falling circuit resistance of the spark gap clamps any further rise in voltage on the high and low voltage winding. The flux in the core decreases at a rate determined by the voltage across the arc. Factors influencing the amplitude of the firing signal include, the spark plug gap, the temperature and the fuel and air mixture pressure in the gap at the time at which firing takes place.

The selector switch S1 is a typical two pole, four throw switch arrangement that permits the pilot to selectively momentarily ground each of the low voltage primary windings on the magneto, the right magneto being controlled by switch deck S1B, pole 50, and the left magneto being controlled by switch deck S1A, pole 49, in this example. This switch is usually in the cockpit on a panel to the left of or in front of the pilot. By selecting the RIGHT position 52, 56, the pilot grounds the left signal lead 103 thereby disabling the left magneto. This permits the pilot to evaluate engine performance while operating on the right magneto only. The pilot selects the LEFT position, 53 and 57, to disable the right magneto enabling him to evaluate engine performance while operating on the left magneto. The BOTH position does not ground either signal line. The OFF position 51, and 55 grounds both magnetos, stopping the engine.

Tachometer Hardware Description

Figure 1:
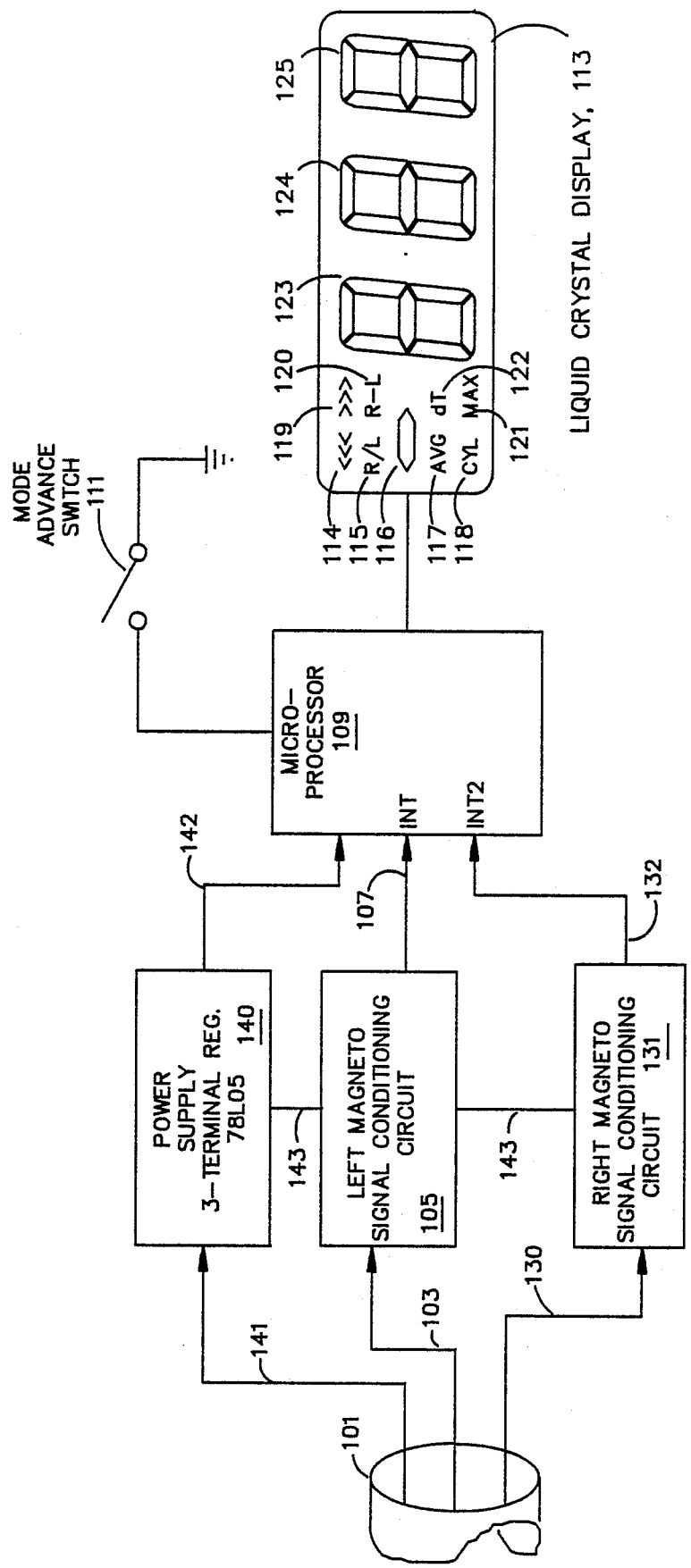
FIG. 1 is a block diagram of the tachometer of the present invention.

In FIG. 1, there is shown a block diagram of the preferred embodiment of the tachometer of the present invention.

Figure 2:
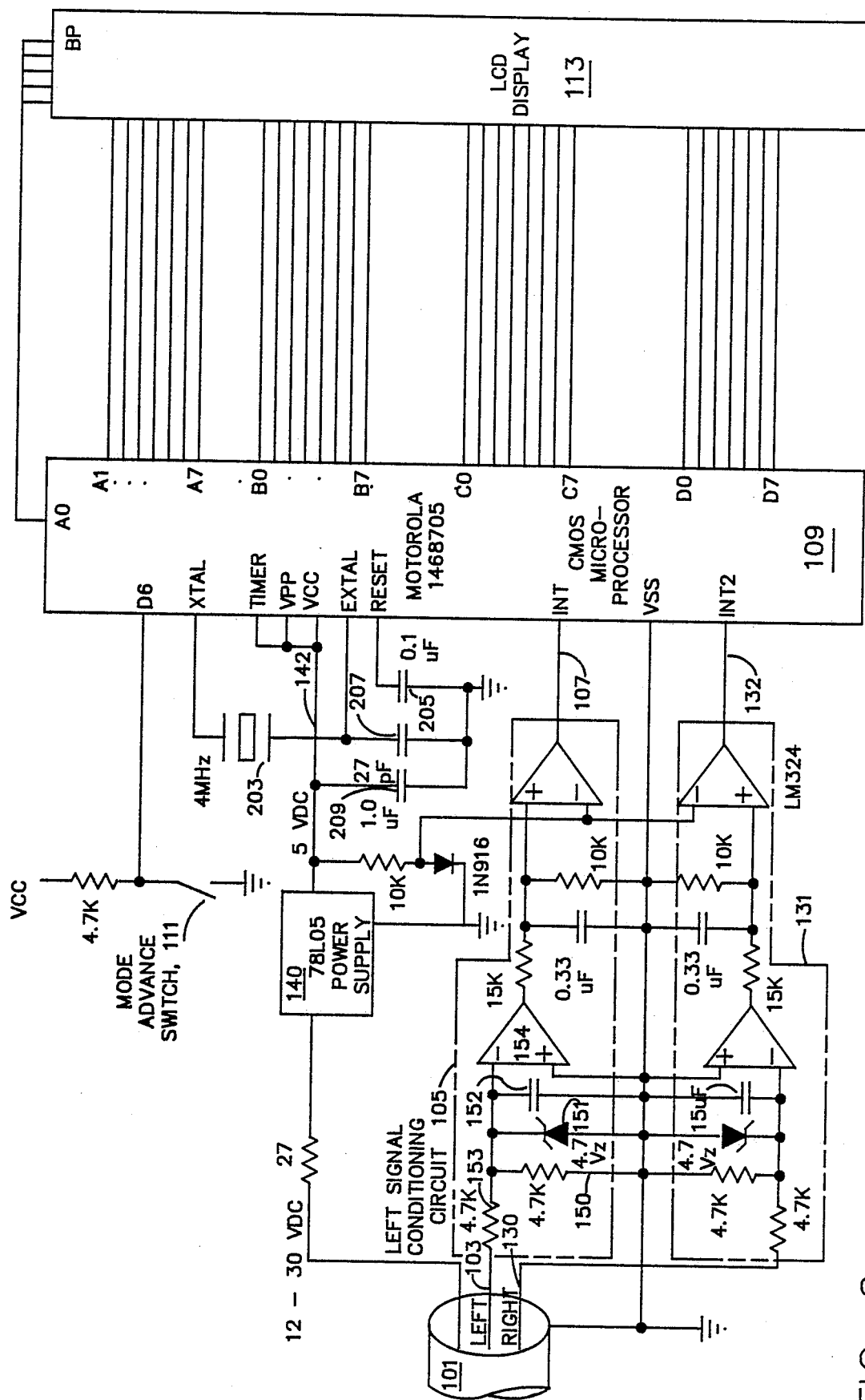
FIG. 2 is a circuit and block diagram showing a microprocessor, signal conditioning circuitry for conditioning firing signals received via a cable from an engine's magnetos, a mode advance switch and a display.

Cable 101 supplies power from the aircraft's battery and generator (not shown) over lead 141 to the tachometer power supply 140. The power supply receives raw voltage from 8 to 28 volts and regulates it, using a type 78L05 three terminal regulator, to an output voltage of 5.0 volts. Resistor 27 of FIG. 2 is a current limiting resistor to protect REGULATOR 140 from excessive aircraft electrical system voltages.

The 5.0 volts service is supplied to the RIGHT and LEFT MAGNETO SIGNAL CONDITIONING CIRCUITS 131 and 105 via lead 143, and to MICROPROCESSOR 109 VCC pin via lead 142.

Capacitor 209 (FIG. 2) connected to lead 142 is a power supply decoupling capacitor for MICROPROCESSOR 109.

Three significant digits of RPM are displayed in digits 123, 124, and 125 of LIQUID CRYSTAL DISPLAY 113, FIG. 1, by MICROPROCESSOR 109 which directly drives each display segment or annunciator according to internal programming and refreshes the display 33 times a second.

LIQUID CRYSTAL DISPLAY 113 (FIGS. 22 and 24) is a custom fabricated display providing 21 segments configured in 3 numeric digits, each digit having a standard seven segment arrangement, and in addition to the digits, nine additional annunciators 114 thru 122 to indicate the mode of tachometer operation.

LIQUID CRYSTAL DISPLAY 113's annunciators 114 thru 122 bear insignia to provide the pilot with feedback as to the particular mode of operation selected. Successive activations of MODE ADVANCE SWITCH 111 (FIG. 1) advances the tachometer through successive modes, as indicated by the annunciators.

MICROPROCESSOR 109 includes an internal timer circuit that operates continuously from the time MICROPROCESSOR 109 leaves its reset state after initial application of power. The reset time is determined by capacitor 205 (FIG. 2). Crystal 203 and capacitor 207 are connected to MICROPROCESSOR 109 and operate an internal oscillator at 4 Mhz, shown in FIG. 18 as block 1801 and also in FIG. 15. The timer circuit divide this 4 Mhz clock via internal divide by 4 counter, a pre-scaler set to divide by 8, and a programmable divider set to divide by 125, to a 1 millisecond rate used to activate an internal subroutine to perform the software timing functions depicted in FIG. 16 via a timer interrupt, TINT.

Cable 101 of FIG. 1 supplies an input train of alternating ignition signals (182, 172, 170, 180, of FIG. 3, and 183 and 173 of FIG. 4) from the engine's magnetos to the RIGHT and LEFT MAGNETO SIGNAL CONDITIONING CIRCUITS 105 and 131 which in turn supplies a train of digital LEFT FIRING PULSES and RIGHT FIRING PULSES, (184 and 186 of FIG. 3, and 187 of FIG. 4) corresponding to the firing of every other cylinder, over lead 107 and 132 to MICROPROCESSOR 109.

The MAGNETO SIGNAL CONDITIONING CIRCUITS 105 and 131 (FIG. 2) are a two stage process involving a divider 150 and 153, zener diode 151, and filter capacitor, 152, in the first stage to divide and clip the high voltage inductive ringing of the firing pulse (FIG. 3, A1 and A2 typically range from $+/-150$ to $+/-250$ volts) at no greater than $+5$ volts and the negative ringing at $-0.7$ volts to protect amplifier 154, and remove the low frequency information coming from the magneto's primary coil.

The second stage of each circuit filters the individual ringing firing pulses passed (eg. 170, FIG. 3) on from the first stage into one digital pulse being on at 5 volts and off at zero volts. The same situation prevails in pulses 173 and 187 of FIG. 4 for the LEFT MAGNETO. These digital pulses can be recognized then by MICROPROCESSOR 109 at the INT and INT2 pins where appropriate subroutines are activated to count and time the digital pulses.

MICROPROCESSOR 109 may be a model MC1478705 manufactured by Motorola Co. of Phoenix Ariz.

Tachometer Software Description

Figure 6:
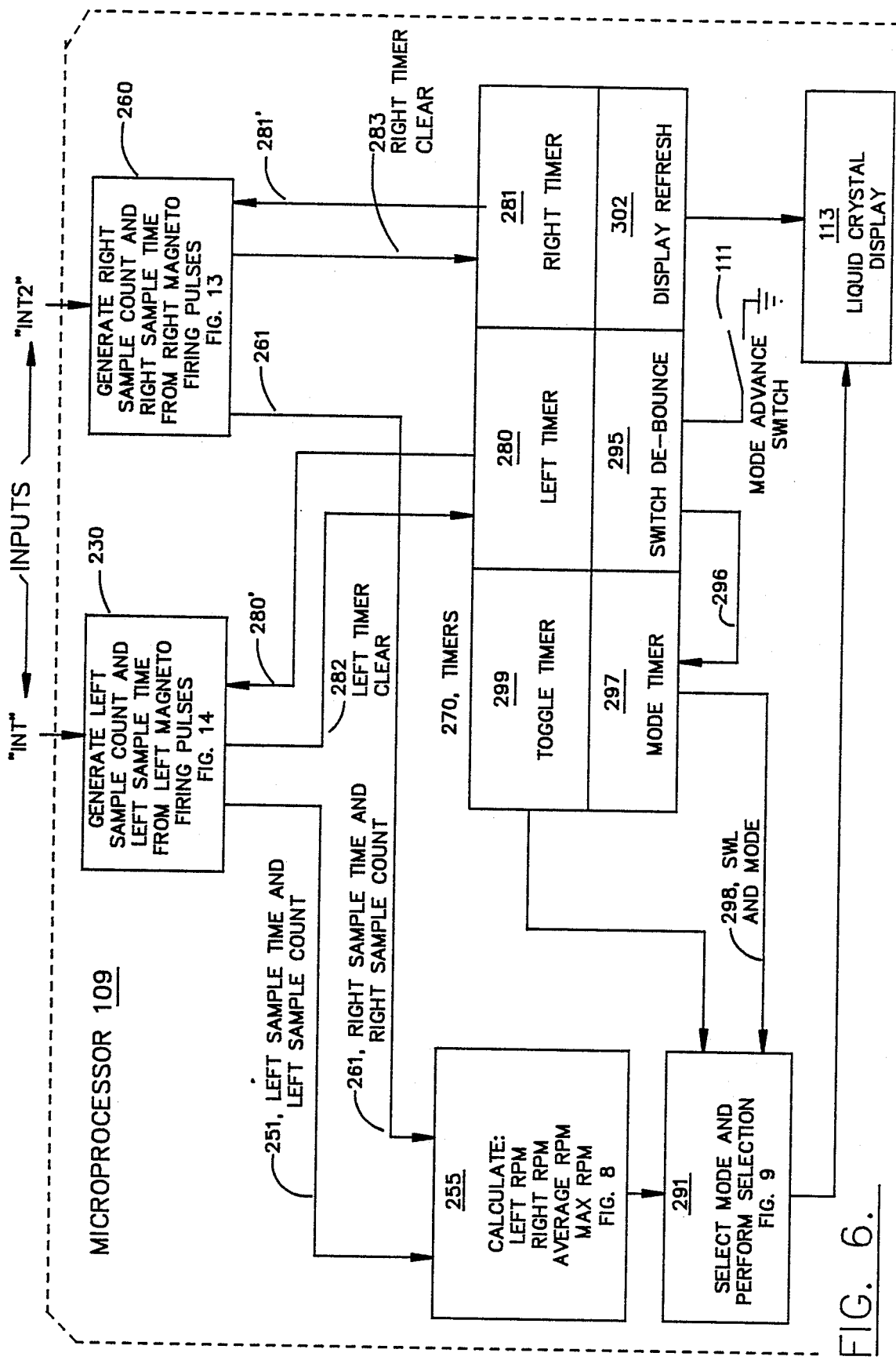
FIG. 6 is a block diagram illustrating the interconnection of the various software subroutines used for deriving and calculating RPM.

FIG. 6 is a block diagram of the different software modules incorporated into the tachometer's MICROPROCESSOR 109 and the general communication paths that exist between them.

Figure 13:
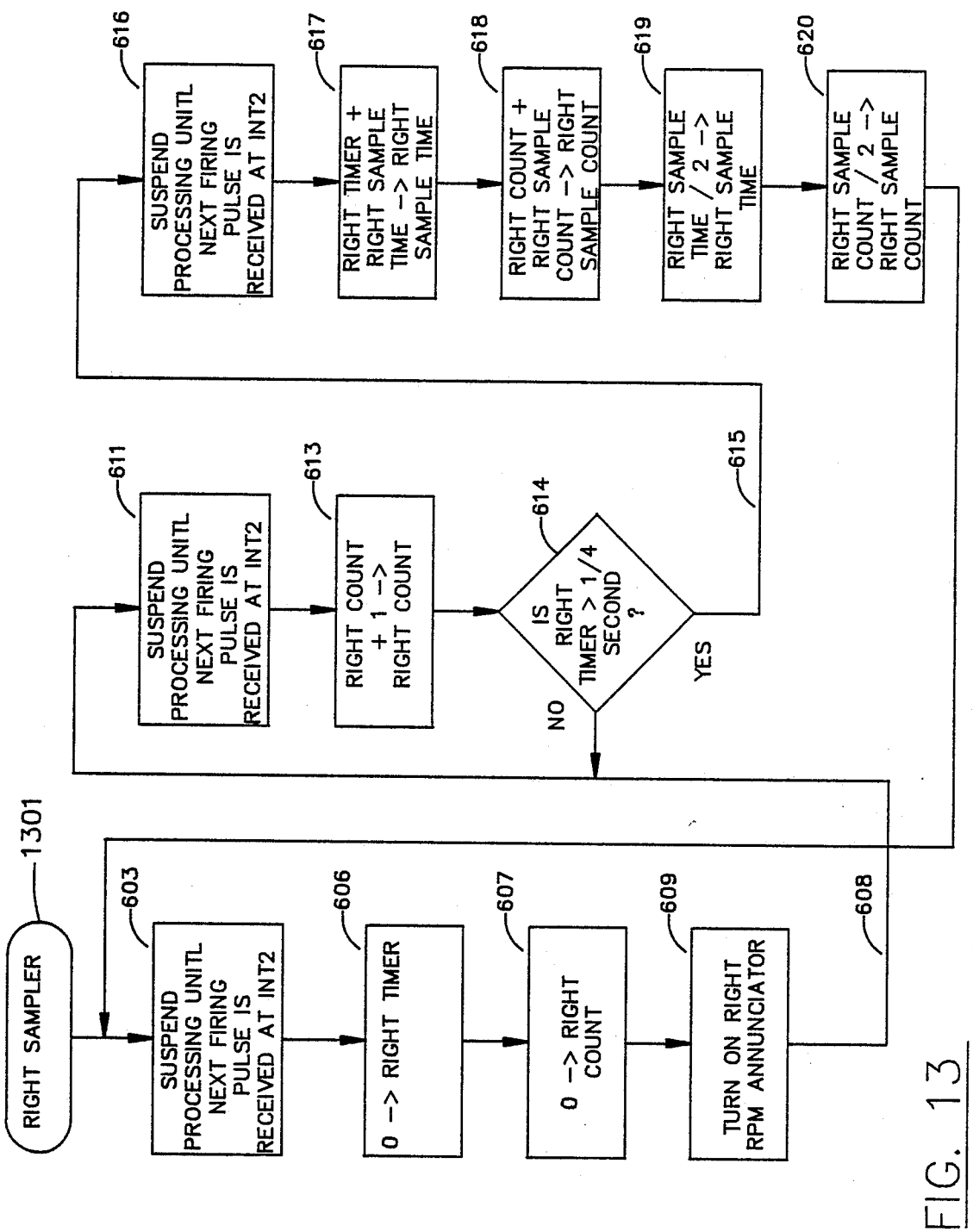
FIG. 13 is a flow chart showing the process for counting firing pulses and determining the sampling period for the left magneto input firing pulses.
Figure 14:
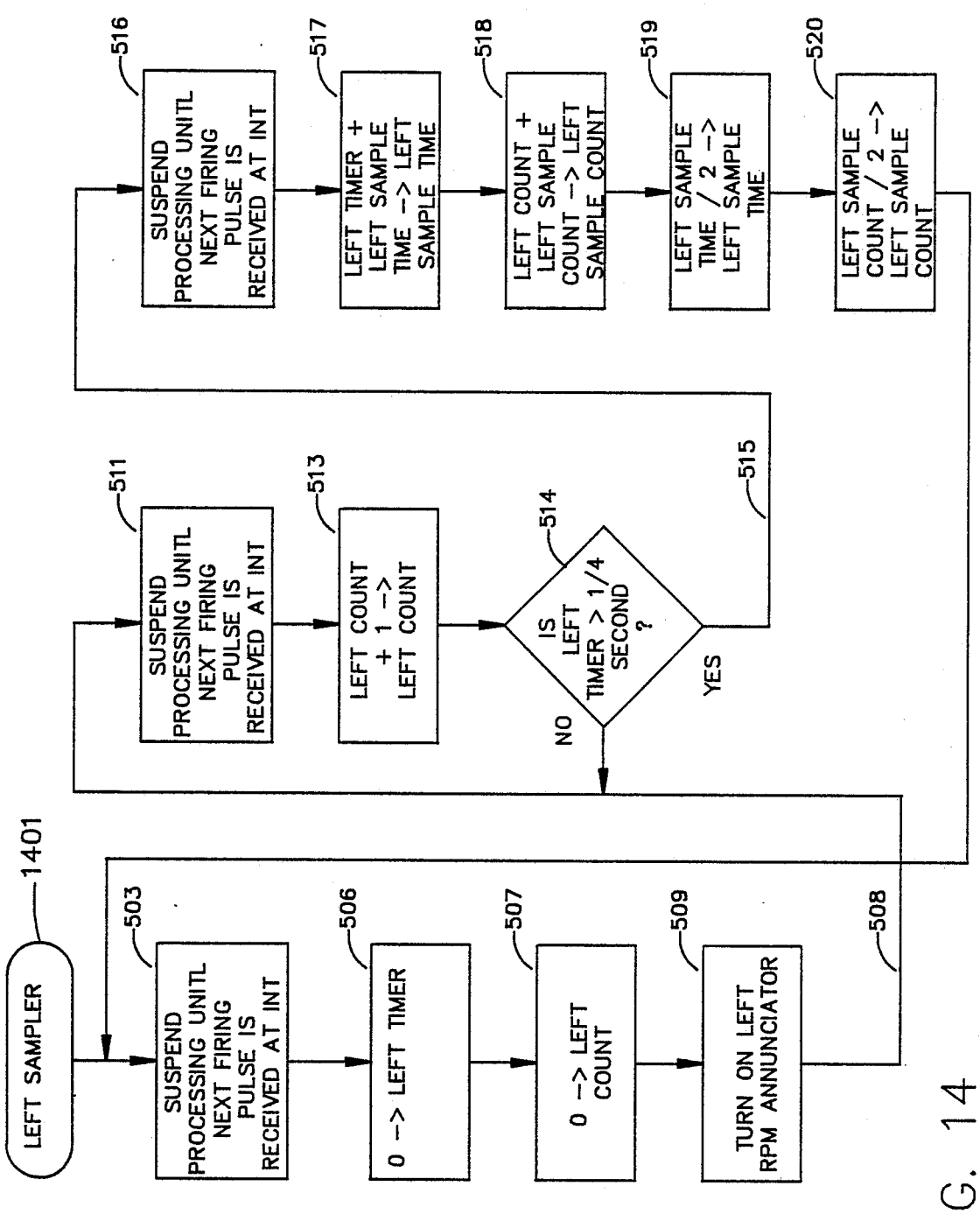
FIG. 14 is a flow chart showing the process for counting firing pulses and determining the sampling period for the right magneto input firing pulses.

SIGNAL CONDITIONING CIRCUITS 105 and 131 supply digital pulse trains to MICROPROCESSOR 109's INT and INT2 pins, via leads 107 and 132 from their respective magnetos, which in turn cause MICROPROCESSOR 109's interrupt circuits to generate the corresponding INT and INT2 interrupts, activating their respective software modules, depicted in blocks 230 and 260 of FIG. 6, and in more detail in FIGS. 14 and 13, respectively. These two software modules are executed immediately as they are the highest priority tasks MICROPROCESSOR 109 has to perform.

Block 230, in FIG. 6, labeled GENERATE LEFT SAMPLE COUNT AND LEFT SAMPLE TIME FROM MAGNETO FIRING PULSES is pictured in greater detail in FIG. 14. Hence, the LEFT SAMPLE TIME and the LEFT SAMPLE COUNT appear on path 251 and are applied to RPM CALCULATION AND MODE SELECTION block 255, which is in turn characterized in greater detail in FIG. 8. Block 230 supplies a LEFT TIMER CLEAR 282 path to the TIMERS 270, and receives LEFT TIMER timing information from the TIMERS via path 280'.

In the same manner, block 260 GENERATE RIGHT SAMPLE COUNT AND RIGHT SAMPLE TIME FROM FIRING PULSES is pictured in greater detail in FIG. 13 and applies the RIGHT SAMPLE TIME and RIGHT SAMPLE COUNT over path 261 to the same block 255. RIGHT TIMER CLEAR 283 is supplied to the TIMERS 270 and timing information for the RIGHT TIMER is received over path 281'.

Block 270 contains the major timing functions, shown in more detail in FIG. 15 and FIG. 16. This is the third highest priority routine and is being executed by MICROPROCESSOR 109 when blocks 230 and 260 are waiting for firing pulses to occur. The timer co-ordinates and maintains the LEFT TIMER 280 and the RIGHT TIMER 281 which in turn are monitored and/or cleared by blocks 230 and 260 respectively.

Block 302 is a sub-section of the timer that refreshes LIQUID CRYSTAL DISPLAY 113, keeping it from fading away between successive calculations of RPM.

Block 299 is the toggle timer and is decremented toward zero by the timer subroutines to provide an indication to block 291 when to switch the RIGHT RPM and LEFT RPM when the invention tachometer is set in TOGGLE RPM MODE.

Block 295 is a sub-section of the timer that monitors MODE ADVANCE SWITCH 111, insuring that when it is closed by the PILOT, that it's contacts are not bouncing and causing erroneous operation of the tachometer.

Figure 17:
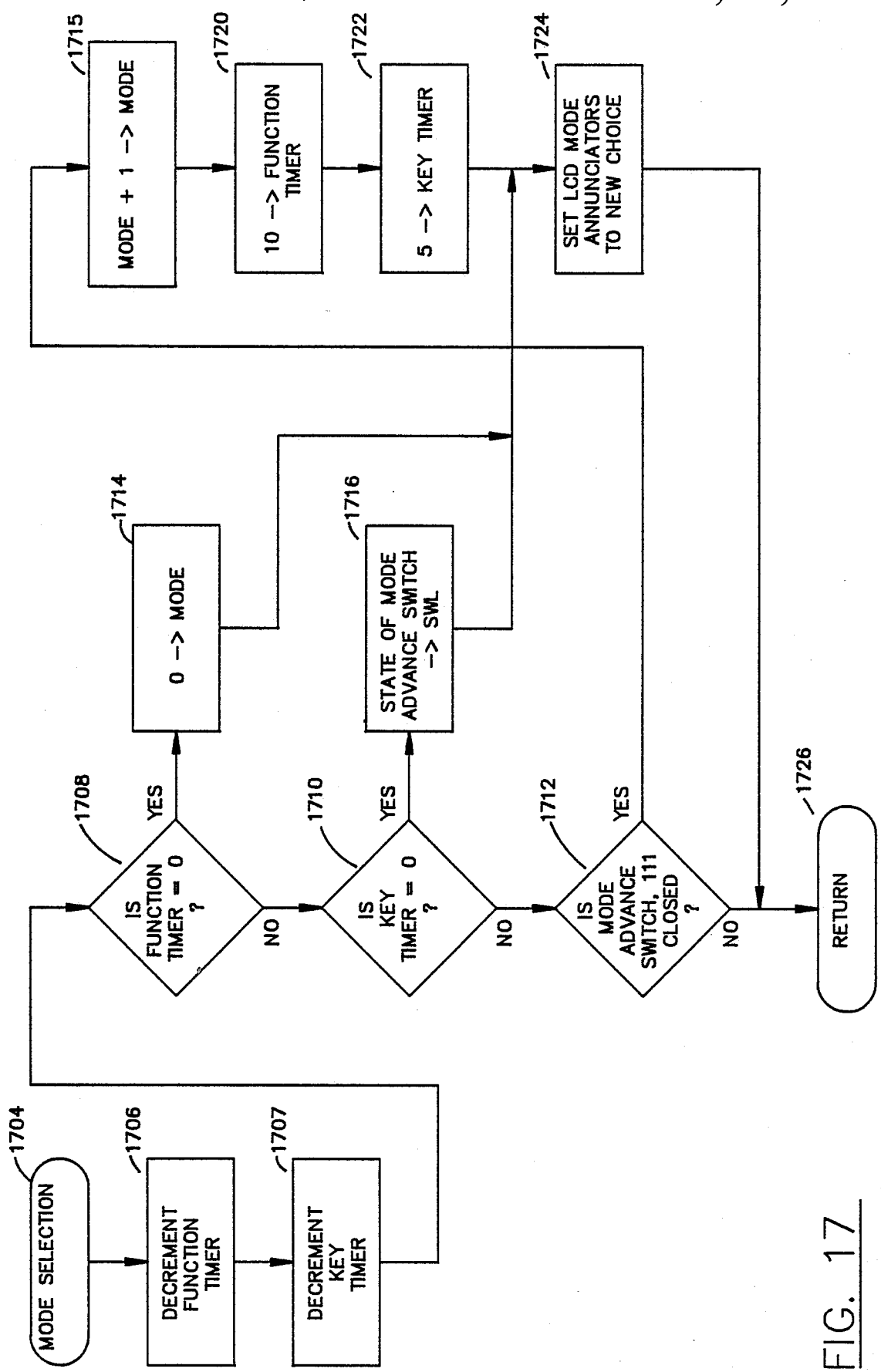
FIG. 17 is a flow chart of the process of using the mode advance switch to select different operating modes.

Path 296 is the communication of de-bounced MODE ADVANCE SWITCH 111 to block 297 where successive closings of the switch result in the selection of different modes of operation for the tachometer, as represented in FIG. 17. The selected mode is communicated to the SELECT MODE AND PERFORM SELECTION block 291 and FIG. 9 via path 298.

Figure 8:
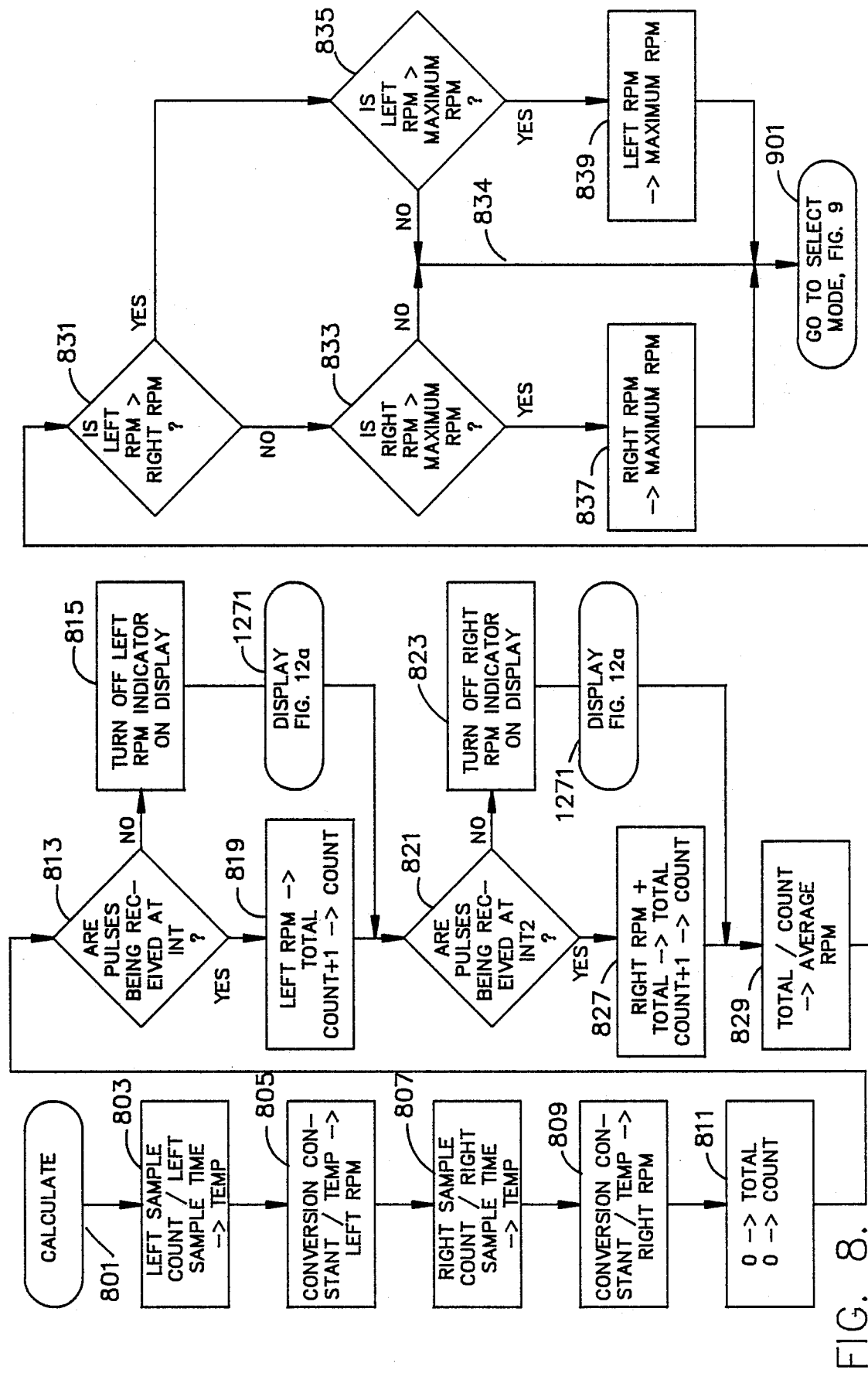
FIG. 8 details the arithmetic sequence for determining Right and Left RPM, Average RPM, and Maximum RPM in flow chart fashion.

Block 255, CALCULATE, seen in more detail in FIG. 8, receives information from block 230 and 260 via paths 251 and 261 respectively, and calculates LEFT RPM, RIGHT RPM, AVERAGE RPM, and MAXIMUM RPM. Additional calculations using the above calculated RPM values are selected from MODE information from path 298 at block 291 with subsequent results being displayed on LIQUID CRYSTAL DISPLAY 113.

FIG. 14 elaborates on block 230 GENERATE LEFT SAMPLE TIME AND LEFT SAMPLE COUNT. The LEFT SAMPLE COUNT is the number of LEFT FIRING PULSES occurring within the LEFT SAMPLE TIME. The LEFT SAMPLE TIME TS1 of FIG. 4 is calculated to start with the occurrence of a LEFT FIRING PULSE appearing at the INT pin and continuing for at least a pre-determined ¼ second, Tpl of FIG. 4 and afterward, to Texl, to include the next encountered LEFT FIRING PULSE. This yields a measured LEFT SAMPLE TIME incorporating an integer number of LEFT SAMPLE COUNTS.

Block 503 suspends processing until a LEFT FIRING PULSE is received by MICROPROCESSOR 109 at its INT pin, FIG. 4 185, which is externally connected to SIGNAL CONDITIONING CIRCUIT 105 via lead 107. The LEFT TIMER is then cleared at 506 (see FIG. 4 191) and the LEFT COUNT is then cleared at 507. The ¼ second pre-determined time period, Tpl, starts when LEFT TIMER is cleared, FIG. 4 193.

The LEFT RPM ANNUNCIATOR is turned on at the next block, 509, to indicate to the pilot that the invention tachometer is receiving LEFT FIRING PULSES.

Control then proceeds, via path 508, to block 511, where processing is again suspended until a LEFT FIRING PULSE occurs. Each LEFT FIRING PULSE received at the INT pin will cause exit from block 511, via path 512, where the pulse is counted at block 513.

Block 514 tests to see if ¼ second Tpl has elapsed since the first LEFT FIRING PULSE was received at 503 an if not, control returns to block 511, via path 508, to suspend processing until the occurrence of another firing pulse to count.

If the ¼ second time limit has expired, see Tpl on FIG. 4, path 515 is taken to block 516 where processing is again suspended until the terminating LEFT FIRING PULSE occurs at INT. Texl on FIG. 4 denotes the extra time waited for the terminating firing pulse. Once the terminating firing pulse occurs, the LEFT TIMER, now the sum of Tpl and Texl times, is averaged with LEFT SAMPLE TIME at block 517 and block 519, and LEFT COUNT is averaged with LEFT SAMPLE COUNT at block 518 and block 520 and control returns to block 503 to start the acquisition of a new set of samples.

Each time FIG. 14 waits for a LEFT FIRING PULSE at INT, blocks 503, 511, and 516 the subroutine is suspended and lower priority subroutines are executed by MICROPROCESSOR 109, in a typical multitasking software design.

LEFT SAMPLE TIME and LEFT SAMPLE COUNT are used in FIG. 8 to calculate LEFT RPM.

FIG. 13 elaborates on block 260 GENERATE RIGHT SAMPLE TIME AND RIGHT SAMPLE COUNT. The RIGHT SAMPLE COUNT is the number of RIGHT FIRING PULSES occurring within the RIGHT SAMPLE TIME. The RIGHT SAMPLE TIME, Tsr of FIG. 3, is calculated to start with the occurrence of a RIGHT FIRING PULSE appearing at the INT2 pin and continuing for at least a pre-determined ¼ second, Tpr of FIG. 3, and afterward, to Texr, to include the next encountered firing pulse. This yields a measured RIGHT SAMPLE TIME incorporating an integer number of RIGHT SAMPLE COUNTS.

Block 603 suspends processing until a RIGHT FIRING PULSE is received by MICROPROCESSOR 109 at its INT2 pin, FIG. 3 184, which is externally connected to SIGNAL CONDITIONING CIRCUIT 131 via lead 132. The RIGHT TIMER is then cleared at 606 (see FIG. 3 188) and the RIGHT COUNT is then cleared at 607. The ¼ second pre-determined time period, Tpr, starts when RIGHT TIMER is cleared, FIG. 3 189.

The RIGHT RPM ANNUNCIATOR is turned on at the next block, 609, to indicate to the pilot that the invention tachometer is receiving RIGHT FIRING PULSES.

Control then proceeds, via path 608, to block 611, where processing is again suspended until a RIGHT FIRING PULSE occurs. Each RIGHT FIRING PULSE received at the INT pin will cause exit from block 611 where each pulse is counted at block 613.

Block 614 tests to see if ¼ second Tpr has elapsed since the first RIGHT FIRING PULSE was received at 603 and if not, control returns to block 611, via path 608, to suspend processing until the occurrence of another firing pulse to count.

If the ¼ second time limit has expired, see Tpr on FIG. 3, path 615 is taken to block 616 where processing is again suspended until the terminating RIGHT FIRING PULSE occurs at INT2. Texr on FIG. 3 denotes the extra time waited for the terminating firing pulse. Once the terminating firing pulse is received, the RIGHT TIMER, now the sum of Tpr and Texr times, is averaged with RIGHT SAMPLE TIME at block 617 and block 619, and RIGHT COUNT is averaged with RIGHT SAMPLE COUNT at block 618 and block 620 and control returns to block 603 to start the acquisition of a new set of samples.

Each time the program of FIG. 13 waits for a RIGHT FIRING PULSE at INT2, blocks 603, 611, and 616, the subroutine is suspended and lower priority subroutines are executed. FIG. 13's subroutine may be suspended for the subroutine depicted in FIG. 14 because FIG. 14 is higher priority within MICROPROCESSOR 109's circuitry.

Figure 7:
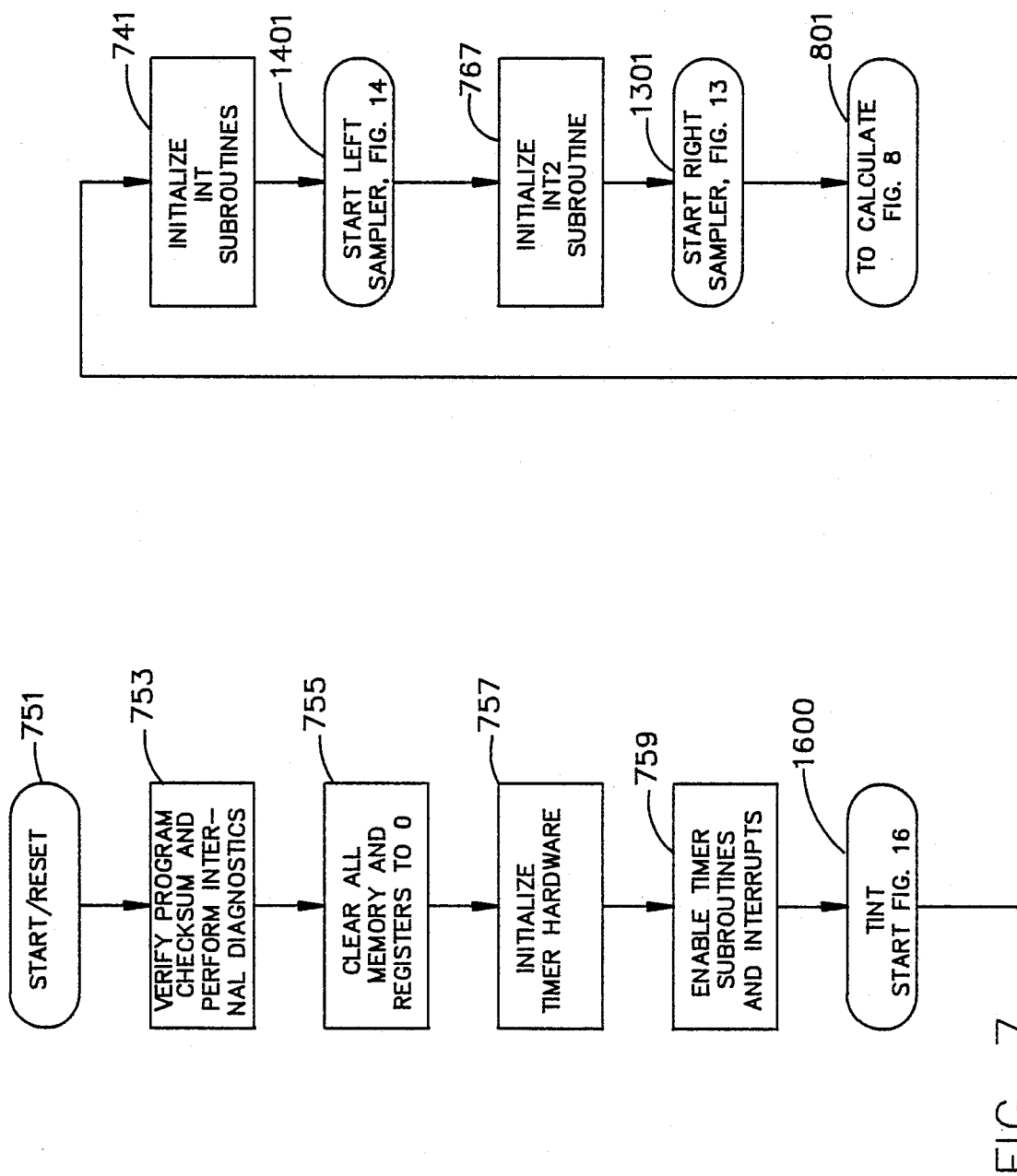
FIG. 7 is a flow chart for the microprocessor's initialization sequence.

FIG. 7 is a flow chart characterizing the initialization sequence of MICROPROCESSOR 109's programming for the invention tachometer. Bubble references such as 751 are used to indicate exit and entry points for subroutines throughout the program.

As power is applied to MICROPROCESSOR 109, capacitor 205 shown in FIG. 2, charges via a resistor internal to MICROPROCESSOR 109, to provide a time delay of a duration sufficient to insure that power has stabilized and is applied to all components before MICROPROCESSOR 109 begins operation. As the voltage on capacitor 205 exceeds a predetermined limit, MICROPROCESSOR 109 begins by fetching its first instruction from a predetermining location in memory referred to by the START/RESET bubble 751.

Functional block 753 represents the steps performed by MICROPROCESSOR 109 in performing a check-sum for the purpose of verifying the MICROPROCESSOR 109, stored program memory.

A failure to perform a correct check-sum results in an error indication and stops MICROPROCESSOR 109 from continuing. Assuming that the check sum performed in accordance with the function of block 753 is correct, the program advances to block 755 which represents the steps required to clear all memory locations and registers prior to the start of operation.

FIG. 7, block 757 represents the steps necessary to transfer constants for use in programming MICROPROCESSOR 109's timers to provide the required one millisecond interrupt and program MICROPROCESSOR 109's input/output pins as output to drive LIQUID CRYSTAL DISPLAY 113.

Block 759 represents the steps required to unmask the timer interrupt by clearing the timer interrupt mask bit in the timer control register and setting up the timer interrupt response addresses to point to the TINT subroutine, block 1600, where MICROPROCESSOR 109 will respond to the timer interrupt. While MICROPROCESSOR 109 is waiting for the first timer interrupt, the program will return to block 741 and continue program execution.

Block 763 represents the steps required to unmask the INT interrupt by clearing the INT interrupt mask bit in MICROPROCESSOR 109's condition code register and setting up the INT interrupt response address to point to the LEFT SAMPLER subroutine, block 1401, where MICROPROCESSOR 109 will respond to the INT interrupt in response to a LEFT FIRING PULSE. While the program at FIG. 14 is waiting for INT interrupt, MICROPROCESSOR 109 will continue the program with block 767.

Block 767 represents the steps required to unmask the INT2 interrupt by clearing the INT2 interrupt mask bit in the auxiliary control register and setting up the INT2 interrupt response address to point to the RIGHT SAMPLER subroutine, block 1301, where MICROPROCESSOR 109 will respond to the INT2 interrupt in response to a RIGHT FIRING PULSE. While the program at FIG. 13 is waiting for the first INT2 interrupt, MICROPROCESSOR 109 will continue the program with subroutine 801.

FIG. 8 depicts the subroutine for determining the RIGHT, LEFT, AVERAGE, AND MAXIMUM RPM calculations. Bubble 801 represents the entry point for the CALCULATE subroutine. At block 803, LEFT SAMPLE TIME is divided by LEFT SAMPLE COUNT to determine the time between consecutive cylinder firings, which is stored in a temporary memory area within MICROPROCESSOR 109 named TEMP. Block 805 illustrates the conversion of engine rotation time in microseconds, stored in TEMP, into LEFT RPM by dividing it into a CONVERSION CONSTANT. This pre-calculated CONVERSION CONSTANT is calculated for conversion of time from microseconds to minutes and selected for the number of cylinders in the engine.

At block 807, RIGHT SAMPLE TIME is divided by RIGHT SAMPLE COUNT to determine the time between consecutive cylinder firings, which is stored in a temporary memory area within MICROPROCESSOR 109 named TEMP. Block 809 illustrates the conversion of engine rotation time in microseconds, stored in TEMP, into RIGHT RPM by dividing it into a CONVERSION CONSTANT. This pre-calculated CONVERSION CONSTANT is calculated for conversion of time from microseconds to minutes and selected for the number of cylinders in the engine.

AVERAGE RPM is calcuated in blocks 811 thru 829. Block 811 clears a counter, COUNT, and a total register, TOTAL. The program continues to block 813 to determine if LEFT FIRING PULSES are being received from the LEFT MAGNETO at the INT pin, and if so, control passes on to block 819 where the valid LEFT RPM is transferred to the TOTAL register and the COUNT register is set to 1, counting the samples totaled in TOTAL. If block 813 determines that no LEFT FIRING PULSES are being received at INT, control passes to block 815, where the LEFT RPM annunciator is turned off, and on to subroutine 1271 for updating of LIQUID CRYSTAL DISPLAY, thus informing the pilot that there is no valid LEFT RPM information. Both block 819 and subroutine 1271 pass control to block 821, where a similar decision is made to determine if RIGHT FIRING PULSES are being received from the RIGHT MAGNETO at the INT2 pin, and if so, control passes to block 827 where the valid RIGHT RPM is added to the TOTAL register and counted in COUNT. If block 821 determines that no RIGHT FIRING PULSES are being received at INT2, control passes on to block 823, where the RIGHT RPM annunciator is turned off, and on to subroutine 1271 for updating of LIQUID CRYSTAL DISPLAY, thus informing the pilot that there is no valid RIGHT RPM information. Control passed from either block 827 or subroutine 1271 to block 829 where AVERAGE RPM is calculated by dividing TOTAL, the sum of the available RPMs, by COUNT, the number of available RPMs.

The proceeding procedure is provided to guarantee that the AVERAGE RPM value is accurate when either or both of the LEFT RPM and RIGHT rpm are present.

Blocks 831 thru block 839 represent the decision making network to determine the largest of the new LEFT RPM, RIGHT RPM or the previously determined MAXIMUM RPM. Program execution continues from block 829 to block 831 where a determination of the greater of the new LEFT RPM and where RIGHT RPM is made. If the LEFT RPM is found to be greater, control passes to block 839 then control passes to block 835 where it is compared with the saved MAXIMUM RPM, where if the LEFT RPM is still greater, it is saved as the new MAXIMUM RPM and the program continues to block 901. If block 831 finds the RIGHT RPM is greater than the LEFT RPM, then control passes to block 833 to compare it with the saved MAXIMUM RPM, where if the RIGHT RPM is still greater, control continues to block 837 where it is saved as the new MAXIMUM RPM and control continues to block 901. If LEFT RPM or RIGHT RPM is less than the current MAXIMUM RPM, as determined at blocks 835 and 833 respectively, path 834 is taken to bypass the update of the current MAXIMUM RPM at blocks 839 and 837, leaving it intact for comparison to future LEFT and RIGHT RPM values and processing continues to block 901.

Figure 9:
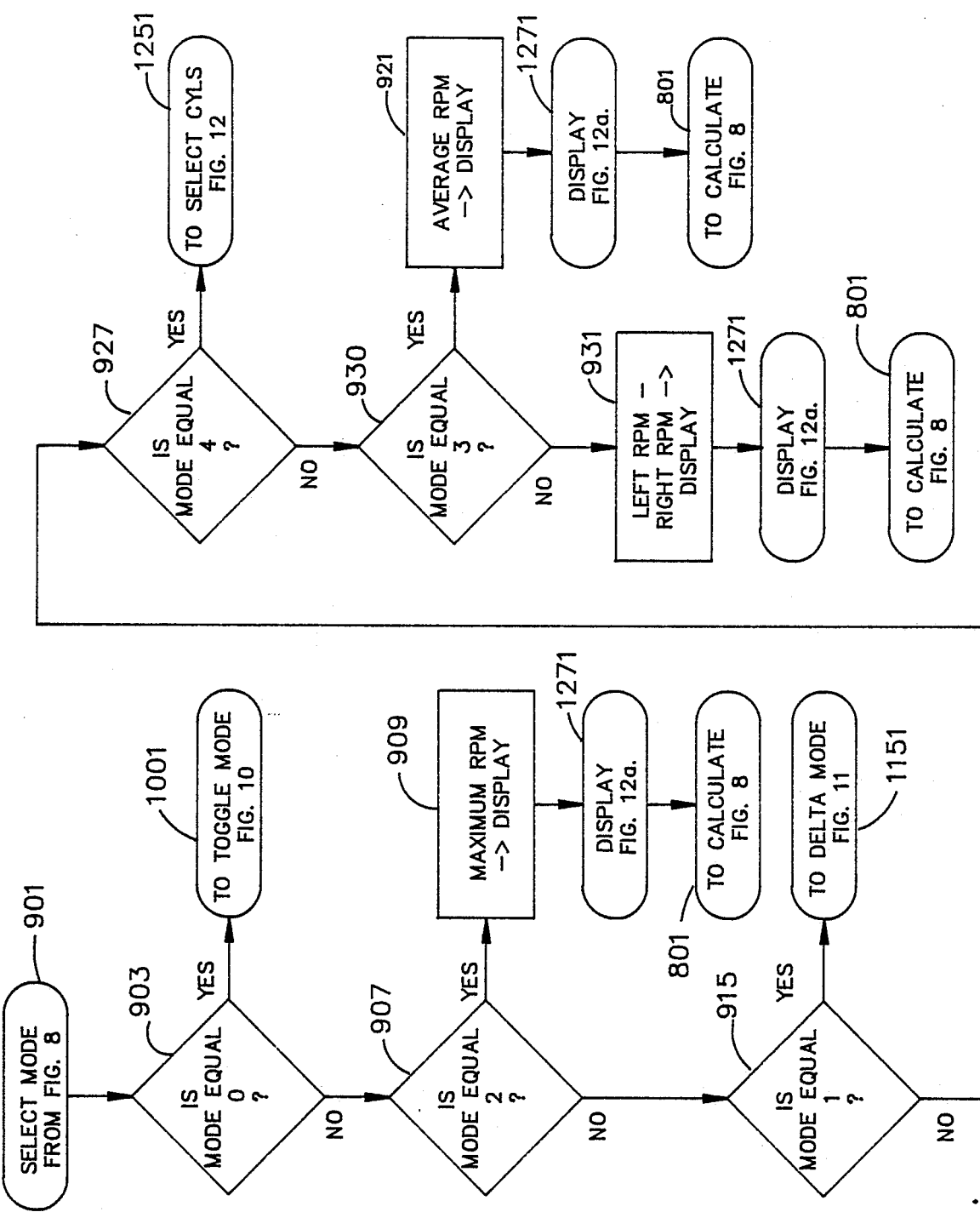
FIG. 9 is a flow chart for mode selection.

Program control the passes to FIG. 9 where the information calculated in FIG. 8 is chosen for display.

FIG. 9 depicts the program steps involved in the SELECT MODE subroutine entered at bubble 901. The SELECT MODE subroutine directs MICROPROCESSOR 109 in accordance with signals received from the MODE SELECTION subroutine, FIG. 17, to select the mode of operation desired by the pilot.

Decision making block 903 examines the contents of the mode register for the purpose of determining if the TOGGLE RIGHT OR LEFT RPM MODE has been selected. In the event that the mode register is equal to zero, the program advances to the TOGGLE MODE via bubble 1001 and is characterized further in connection with a discussion of FIG. 10.

If TOGGLE RPM MODE was not selected in block 903, block 907 checks to determine if the mode register is equal to two for the selection of MAXIMUM RPM. Selection of MAXIMUM RPM MODE passes control to block 909 and subroutine 1271 where the MAXIMUM RPM, from FIG. 8, is copied to the display register and subsequently displayed on LIQUID CRYSTAL DISPLAY for the pilot at the DISPLAY subroutine of FIG. 12A. Control of the program then returns to CALCULATE, subroutine 801, to process the next set of RPM samples.

If MAXIMUM RPM MODE is not selected at block 907, control proceeds to block 915 to determine if the mode register is equal to one for DELTA MODE of operation. If the mode register is equal to one, control is passes, via bubble 1151, to the DELTA MODE subroutine in FIG. 11 for further processing.

If DELTA RPM MODE is not selected in block 915, control proceeds to block 927 to determine if the mode register is equal to four for SELECT CYLINDER MODE of operation. If the mode register is equal to four, control passes to the SELECT CYLS subroutine, via bubble 1251, for subsequent processing in FIG. 12.

If SELECT CYLINDER MODE is not selected in block 927 control proceeds to block 930 to determine if the mode register is equal to three for AVERAGE RPM MODE of operation. If the mode register is equal to three, control passes to block 921 where the previously calculated AVERAGE RPM from FIG. 8 block 829, is copied to the display register and subsequently displayed via the DISPLAY subroutine, 1271, of FIG. 12A. Block 801 then passes control to CALCULATE to process a new set of RPM samples.

If the AVERAGE RPM MODE is not selected in block 930, then control passes to block 931 where the difference of RIGHT RPM and LEFT RPM is copied to the display register for subsequent display via subroutine 1271 for DIFFERENCE MODE. Control is passed back to CALCULATE, subroutine 801, for processing of a new set of RPM samples.

FIG. 10 describes the TOGGLE MODE in detail and is entered via bubble 1001. The TOGGLE MODE provides the steps for alternately displaying the LEFT RPM and RIGHT RPM. Decision making block 1003 determines if the toggle flag is equal to 1, and if it is, the program advances to block 1005 at which point the value of the RIGHT RPM is transferred to the display register at block 1005. If the toggle flag is not equal to 1, control proceeds to block 1007 and transfers the value of the LEFT RPM to the display register. Both block 1005 and block 1007 then proceed to subroutine 1271 where LIQUID CRYSTAL DISPLAY is updated via the DISPLAY subroutine, FIG. 12A.

At block 1011, TOGGLE TIMER 299 is tested to see if it has been decremented to zero by the timer subroutines, and if so, control passes to block 1013 where the TOGGLE TIMER is reset to another 10 seconds and the TOGGLE FLAG is inverted or toggled (1 changed to a 0 or 0 changed to a 1) to cause block 1003 to select between RIGHT RPM and LEFT RPM. Control then passes back to CALCULATE via path 1017 to subroutine 801 for processing of new RIGHT RPM and LEFT RPM samples. If the TOGGLE TIMER is not zero at block 1011, then the current state of the toggle FLAG is left un-altered and processing proceeds back to CALCULATE subroutine 801 for a new set of RIGHT and LEFT RPM values, via bubble 801.

FIG. 11 describes the DELTA MODE entered via bubble 1151. Decision block 1153 determines if MODE ADVANCE SWITCH 111 is closed. If the switch is closed, the program advances to block 1155 and transfers the value of the average RPM to the saved RPM register location, after which the program advances to block 1157.

If MODE ADVANCE SWITCH 111 is not closed, the program advances from block 1153 to block 1157 for the purpose of transferring the value of the average RPM minus the value of the saved RPM to the display register. The program then advances to the DISPLAY subroutine via subroutine 1271 to update the display. The program then advances to the CALCULATE subroutine, 801, described in connection with FIG. 8.

FIG. 11a is provided to describe the process by which the program continually refreshes LIQUID CRYSTAL DISPLAY 113 to insure a high contrast ratio. The refresh subroutine is entered via bubble 1170 from the TIMER subroutine of FIG. 16. Decision making block 1172 determines if the program has passed thru this subroutine at least 33 times. If the program has not passed through this subroutine 33 times, the program branches to block 1174 at which point the pass counter is incremented by a count of 1 and the new pass count is transferred to the pass counter register. From either blocks 1178 or 1174, control will continue to block 1180 where MICROPROCESSOR 109 returns to the timer subroutines of FIG. 16.

If decision block 1172 determines that the program has had 33 passes through the subroutine, the program advances to block 1175 and complements all of LIQUID CRYSTAL DISPLAY 113's segments and backplane. The program then advances to block 1178 and transfers zero to the pass counter register. The program then returns via bubble 1180 to the subroutine that called the refresh subroutine such as block 1608 in FIG. 16.

Figures 12, 12A:
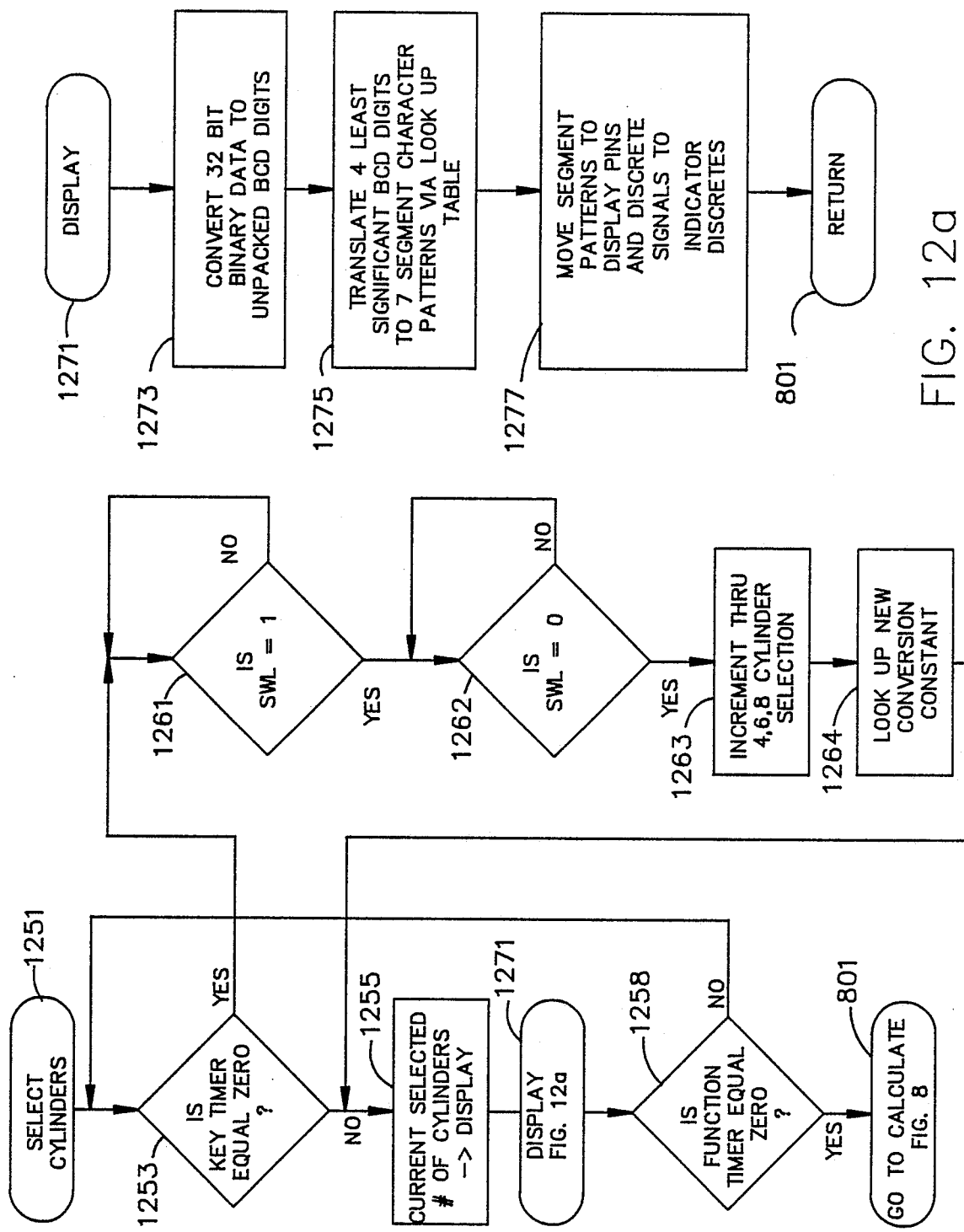
FIG. 12 is a flow chart for selecting Number Of Cylinders.
FIG. 12a is a flow diagram for updating the liquid crystal display.

FIG. 12 characterizes the SELECT CYLINDERS subroutine via bubble 1251 to allow the pilot to select the number of cylinders that the engine has. The program advances to decision making block 1253 to determine if the KEY TIMER is equal to zero, indicating that SELECT CYLINDERS MODE is selected and that SWL will indicate the state of MODE ADVANCE SWITCH 111.

The KEY TIMER is a five second timer described in connection with FIG. 17. If the KEY TIMER is equal to zero, the program branches to decision making block 1261 to determine if SWL is equal to 1, indicating MODE ADVANCE SWITCH 111 is open. If the SWL is not equal to 1, indicating switch closure, decision making block 1261 is re-entered and the subroutines continues to recycle. If the SWL is equal to 1, the subroutine advances to decision making block 1262 to determine if the SWL is equal to zero. Decision making blocks 1261 and 1262 function to mark the point at which pilot releases the MODE ADVANCE SWITCH 111 from the depressed position.

If the SWL is equal to zero, the program exits decision making block 1262 and advances to block 1263 to increment or select a different number of cylinders, after which the program advances to block 1264 to loop up a new CONVERSION CONSTANT from a table of pre-calculated CONVERSION CONSTANTs, one for each size of engine, in cylinders, the tachometer can be used with, described in connection with FIG. 8. The program then advances to block 1255.

Returning again to decision making block 1253, if the KEY TIMER is not equal to zero, the program advances to block 1255 to display the number of cylinders selected for use with the engine. The program then advances to the display subroutine 1271 and then to decision making block 1258 to determine if the FUNCTION TIMER is equal to zero.

If the FUNCTION TIMER is not equal to zero, the program returns to the entry point for decision making block 1253. If the FUNCTION TIMER is equal to zero, the program advances to the CALCULATE subroutine, 801, further described in detail in connection with FIG. 8.

The CONVERSION CONSTANT is a number calculated based upon the number of cylinders in the engine, conversion of microseconds to minutes, and adjustments for mechanical and signal processing, that is used to convert the internal measurements of LEFT and RIGHT SAMPLE TIME and SAMPLE COUNT into revolutions per minute.

As a four cycle engine is taken through one revolution, the number of firing pulses (FP) that will be produced is equal to the number of cylinders (CYLS) times the number of revolutions (REVS) devided by 2.

$$FP = CYLS * REVS/2$$

therefore:

$$REVS = 2 * FP/CYLS$$

Since the signal conditioning circuit passes only positive firing pulses, the number of firing pulses is equal to two (2) times the sample count (SC). Substituting 2*SC for FP in the above equation yields:

$$REVS = 4 * SC/CYLS$$

where SC represents the same count. No interval is specified to this point. SC is a pulse count for an interval expressed in microseconds which, under program control, has a minimum duration of 250 milliseconds but which varies in duration as explained in the specification, is extended to end at the arrival of the last sample pulse. The interval is called sample time or ST. MICROPROCESSOR 109 determines the ratio of a value of SC for an ST interval expressed in microseconds. The value is converted to counts per minute by multiplying the result by 60*10E+6, which has the dimension of microseconds per minute.

$$REVS/MIN = [4/CYLS] * [SC/ST] * 60 * 10E + 6$$

The term 1/ST, has the dimension of 1/microseconds. The conversion term of 60*10E+6 has the dimension of microseconds/MIN. When the units are inserted into the right side of the above expression, the resulting units are REVS/MIN. The same units are present on the left side of the above equation.

Re-arranging the above equation, all the multiplication operations can be removed, leaving only division operations.

$$REVS/MIN = [240,000,000/CYLS]/[ST/SC]$$

To minimize the amount of work required to calculate an RPM value, all calculations that can be performed once beforehand and then saved for future use, are stored in a table within MICROPROCESSOR 109 that can be indexed be the selected number of cylinders:

| Calculation | | CONVERSION CONSTANT | Engine Size, Cylinders |
|---|---|---|---|
| 240,000,000/4 | = | 60,000,000 | 4 |
| 240,000,000/6 | = | 40,000,000 | 6 |
| 240,000,000/7 | = | 34,258,714 | 7 |
| 240,000,000/8 | = | 30,000,000 | 8 |
| 240,000,000/9 | = | 26,666,666 | 9 |
| 240,000,000/11 | = | 21,818,181 | 11 |

| Calculation | | CONVERSION CONSTANT | Engine Size, Cylinders |
|---|---|---|---|
| 240,000,000/12 | = | 20,000,000 | 12 |
| 240,000,000/14 | = | 17,142,857 | 14 |

Substituting into the above equation yields:

$$REVS/MIN = [CC]/[ST/SC]$$

where CC represents a selected conversion constant from the above table.

This technique reduces the required calculations to just three division operations, removing two multiplications and the need to include any multiplication subroutines within MICROPROCESSOR 109, thus improving efficiency and reducing the amount of stored programs.

FIG. 12a is a detail description of the DISPLAY subroutine entered via bubble 1271 from a variety of points throughout the program. Block 1273 depicts the step of converting the 32 bit number into a plurality of BCD (binary coded decimal) numbers. The program then advances to block 1275 which translates the four least significant BCD digits into the required seven segment character patterns via a ROM lookup table within MICROPROCESSOR 109.

Figures 22, 23:
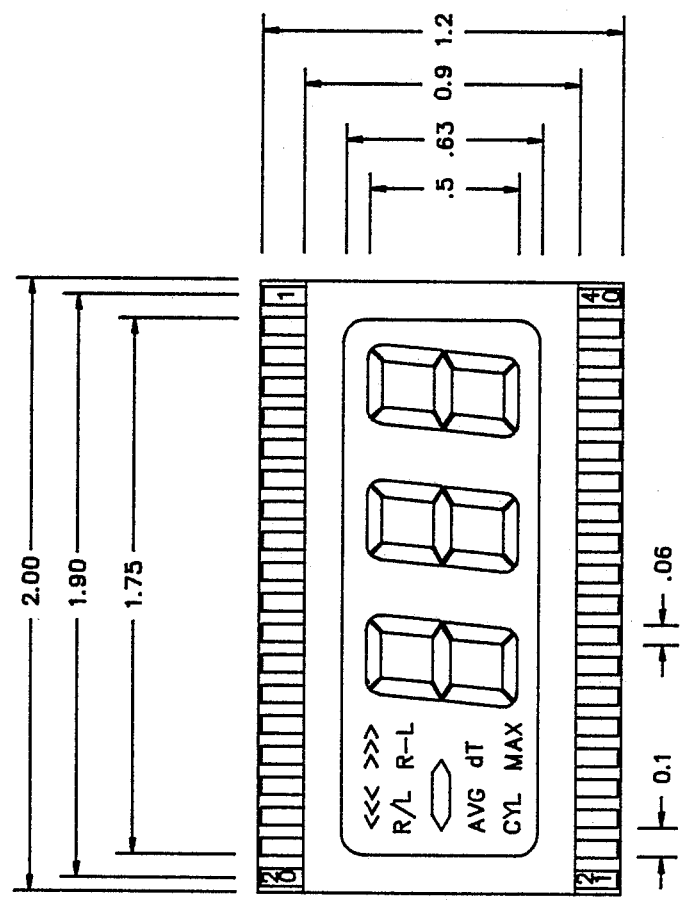
FIG. 22 is a plan view of the layout for the invention liquid crystal display.
FIG. 23 is a chart characterizing the pin assignment for the liquid crystal display of FIG. 22; and, FIG. 24 is a perspective view of the invention tachometer apparatus in case with cable.

FIGS. 22 and 23 depict LIQUID CRYSTAL DISPLAY 113, with numeric digits and MODE INDICATORS, as labeled in FIG. 1. Dimensions for the display are also given. Each of the different modes of operation are indicated by the illumination of one of: R/L, toggle right and left rpm mode; R-L, difference of right and left rpm mode; AVG, the average rpm mode; dT, change in rpm mode; CYL, cylinder selection mode; and MAX, display of maximum rpm mode. "<<<" and ">>>" are the LEFT and RIGHT RPM ANNUNCIATORS used to indicate to the pilot that firing pulses are being generated by each magneto. FIG. 23 is the pin assignments for LIQUID CRYSTAL DISPLAY 113 as would be fabricated specially for use with the example tachometer.

The program then advances to block 1277 for the purpose of moving the segment patterns and discrete annunciators to the display pins on LIQUID CRYSTAL DISPLAY 113. The program then advances to bubble 1279 to return to the subroutine from which the DISPLAY subroutine was entered.

FIG. 15 depicts the relationship between MICROPROCESSOR 109's internal timer circuits, 4 Mhz OSCILLATOR and CRYSTAL 203, internal DIVIDE BY 4 OSCILLATOR PRESCALER 1502, DIVIDE BY 8 PROGRAMABLE PRESCALER 1504, DIVIDE BY 125 PROGRAMABLE DOWN COUNTER 1506, and the TIMER SUBROUTINES of FIG. 16.

The pre-scaler is selected along with the programmable divider to provide a 1 msec TINT interrupt, 1508, to the TIMER SUBROUTINES, via 1602, and are programmable through internal resisters within MICROPROCESSOR 109, see FIG. 7.

FIG. 16 depicts the software flow that occurs each time the TIMER CIRCUIT provides its 1 msec interrupt to MICROPROCESSOR 109. Block 1506 provides an event every Block 1508 provides an event every one millisecond that in turn interrupts the normal program flow of MICROPROCESSOR 109 and forces the TINT subroutines to resume operation from block 1602. Block 1602 suspends the operation of TINT subroutines until the interrupt is received. This allows lower priority tasks to operate between interrupts. When a TINT interrupt is received, the TINT subroutine is resumed and MICROPROCESSOR 109 continues with block 1604. Block 1604 increments the LEFT TIMER and block 1606 increments the RIGHT TIMER by one millisecond. This keeps the elapsed time for the ¼ second pre-determined interval and LEFT AND RIGHT SAMPLE TIME (see FIG. 13 and FIG. 14).

Block 1170 calls the subroutines depicted in FIG. 11A where LIQUID CRYSTAL DISPLAY is refreshed.

Upon return from block 1170, the program continues to block 1610 which depicts the function of debouncing MODE ADVANCE SWITCH 111. This routine removes the un-desired effect of the switch contacts bouncing when the switch is opened and closed. Switch bounce, if not properly eliminated, will cause faulty operation of the tachometer to occur.

The program then advances to block 1614. The program function represented by block 1614 is the step of decrementing the TOGGLE TIMER every millisecond. The TOGGLE TIMER is used in FIG. 10 to control the change of the display from RIGHT RPM to LEFT RPM and back again.

The program then advances to block 1704 which references the MODE SELECTION subroutine of FIG. 17 where the debounced MODE ADVANCE SWITCH 111 is used to determine the mode of operation of the tachometer and subsequently operate the tachometer's modes. Upon return from the MODE SELECTION subroutine, program control continues back to block 1602 to wait for the next TINT INTERRUPT.

FIG. 17 depicts the MODE SELECTION function of the SOFTWARE TIMER. The MODE SELECTION process uses a FUNCTION TIMER, a KEY TIMER and the debounced MODE ADVANCE SWITCH 111. Block 1704 is the entry point for the MODE SELECTION subroutine from FIG. 16. The FUNCTION TIMER and the KEY TIMER are both decremented by operation of blocks 1706 and 1707 each time through the subroutine.

If the FUNCTION TIMER is allowed to decrement to zero, at decision block 1708, the MODE SELECTION is set to 0 (Block 1714) and LIQUID CRYSTAL DISPLAY 113's annunciators 115-122 are adjusted to reflect the new mode at block 1724. This is the default or relaxed state of the tachometer mode selection.

If a mode other than mode 0 is selected, the FUNCTION TIMER is not zero and the KEY TIMER is running the program proceeds to block 1710. The KEY TIMER is a five second timer which limits the time the PILOT has to select another mode of operation. If the KEY TIMER is zero at 1710, the MODE SELECTION is not affected by MOST ADVANCE SWITCH 111 and MODE ADVANCE SWITCH 111 is made available, at block 1716, to FIG. 9 Blocks 903-927 via SWL, which reflects MODE ADVANCE SWITCH 111 during this time. If at block 1710 the KEY TIMER has not been decremented to zero, then block 1712 tests MODE ADVANCE SWITCH 111 for closure. If MODE ADVANCE SWITCH 111 is closed, control passes to block 1715 to increment the MODE SELECTION. The program continues on to restart the FUNCTION TIMER at block 1720, and restart the KEY TIMER at block 1722. Blocks 1722, 1714, and 1716 branch to block 1724 to update LIQUID CRYSTAL DISPLAY 113 with the newly selected mode of operation, and onto block 1726 to return to the previous tasks of FIG. 16. If MODE ADVANCE SWITCH 111 is not closed at block 1712, control returns back to the subroutines in FIG. 16, via block 1726.

MODE is a register containing a number passed to FIG. 9 corresponding to the following functions:
0—ALTERNATELY DISPLAY RIGHT RPM AND LEFT RPM
1—DISPLAY CHANGE IN RPM
2—DISPLAY MAXIMUM RPM
3—DISPLAY AVERAGE RPM
4—SELECT THE NUMBER OF CYLINDERS
5—DISPLAY THE DIFFERENCE BETWEEN THE RIGHT RPM AND LEFT RPM It should be noted that although RPM information continuously flows from block to block through the tachometer as indicated in FIG. 6, subroutines indicated by blocks 230, 260, 270 and 255 & 291 are operating independently of each other. These subroutines will loop upon themselves as long as the tachometer is operating passing only information to the other subroutines. Four major subroutines exist and are prioritized as follows: INT (Left Magneto or block 230), INT2 (Right Magneto or block 260), TINT (Timers or block 270), and a program level or default level (RPM calculation and mode selection 255, perform selection 291).

Program control of MICROPROCESSOR 109 is changed from one subroutine to another via the internal interrupt structure of MICROPROCESSOR 109. When an interrupt occurs (because of cylinder firing or 1 msec timer), and that interrupt is higher priority than the currently running subroutine, the current subroutine is suspended at the current instruction and the corresponding new subroutine is invoked. When the invoked subroutine determines that it has finished, it returns control to the interrupted subroutine which continues execution until the next interrupt occurs.

This interrupting-suspending-resuming process may occur at any time as long as the priority scheme allows. When no subroutine is active due to an interrupt, MICROPROCESSOR 109 resumes the lowest priority subroutine which encompasses FIG. 8, FIG. 9, and related subroutines.

Figure 18:
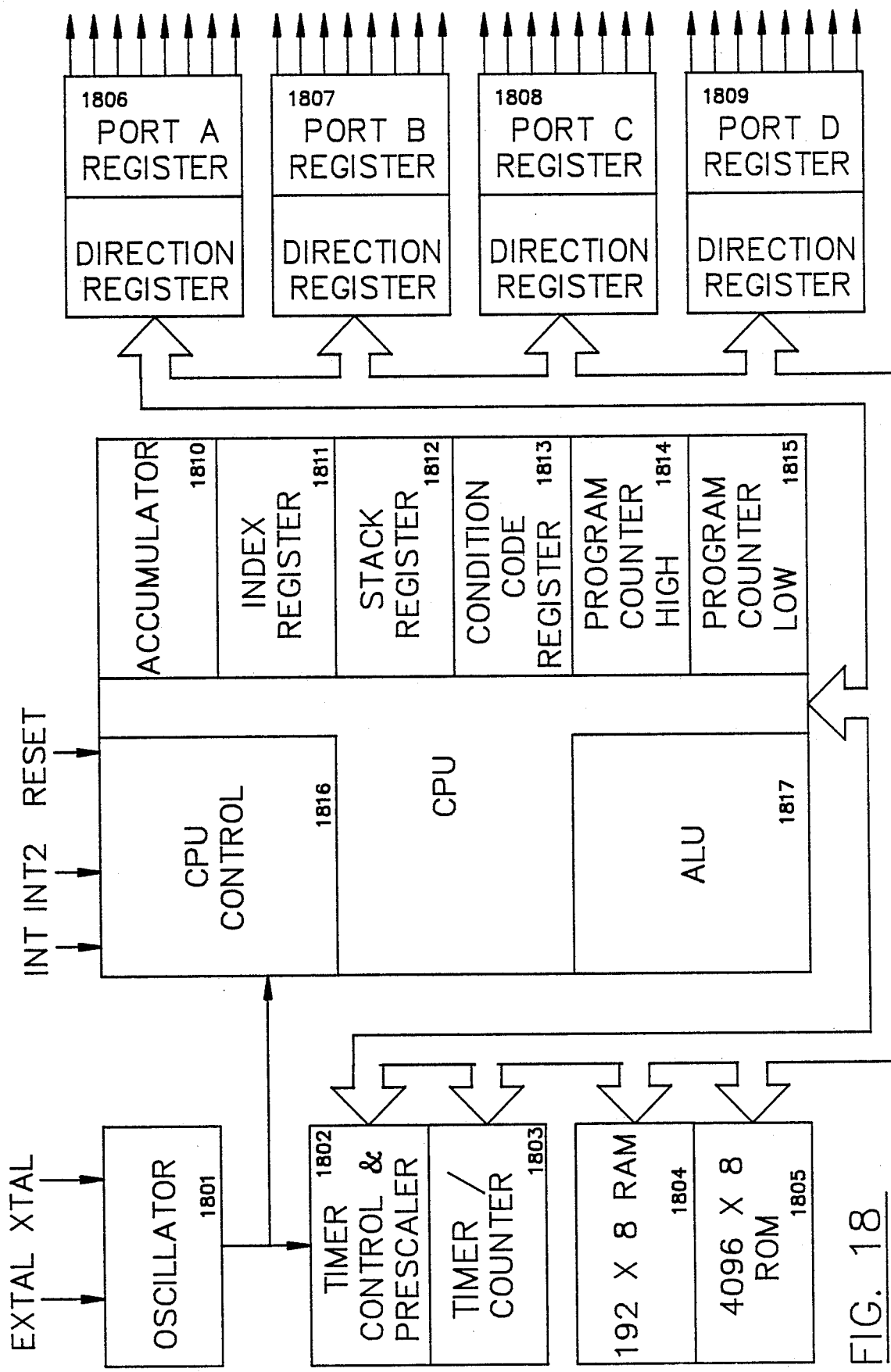
FIG. 18 is a block diagram of the microprocessor.

FIG. 18 is a block diagram of MICROPROCESSOR 109 indicating it's major features. Blocks 1806 thru 1809 represent the input/output pins and associated circuitry allowing this implementation of MICROPROCESSOR 109 to communicate with LIQUID CRYSTAL DISPLAY 113. Each associated direction register is programmed as output in FIG. 7 when the initialization occurs. The oscillator 1801 provides timing and clocking of MICROPROCESSOR 109 and a time base for its timer circuits, block 1802 and block 1803 depicted in FIG. 15 also.

Block 1804 depicts 192 eight bit bytes of storage used primarily as registers and temporary storage. Also contained within an area of the RAM storage is a STACK AREA (not shown) that provides storage of MICROPROCESSOR 109's internal registers during interrupts and subroutine calls. This stack area is pointed to by the STACK REGISTER 1812 within the CPU itself.

Block 1805 depicts 4096 eight bit bytes of permanent storage that will not be lost during power off conditions. This ROM storage contains the programs previously described and is pointed to by the CPU with the CPU's internal PROGRAM COUNTER HIGH 1814 and PROGRAM COUNTER LOW 1815 registers, which determine the instruction to be executed.

Block 1810 is the ACCUMULATOR which contains the results of any mathematical operation the ALU 1817, or Arithmetic Logic Unit, performs as indicated by the instruction pointed to by the PROGRAM COUNTER. The CONDITION CODE REGISTER 1813 contains the status of ALU operations such as if the result was zero, negative, did a carry result from addition or subtraction, is an interrupt pending, and so on. The INDEX REGISTER 1811 provides a convenient method of addressing the RAM or ROM memory for data without having to code the address of the desired location within the instruction itself. This makes manipulating tables and counting loop iterations much easier.

Block 1816 depicts the CPU CONTROL and is responsible for directing and co-ordinating cpu operations such as fetching the next instruction, reading and writing to memory, branching and subroutine calls, and interrupt response.

Figure 19:
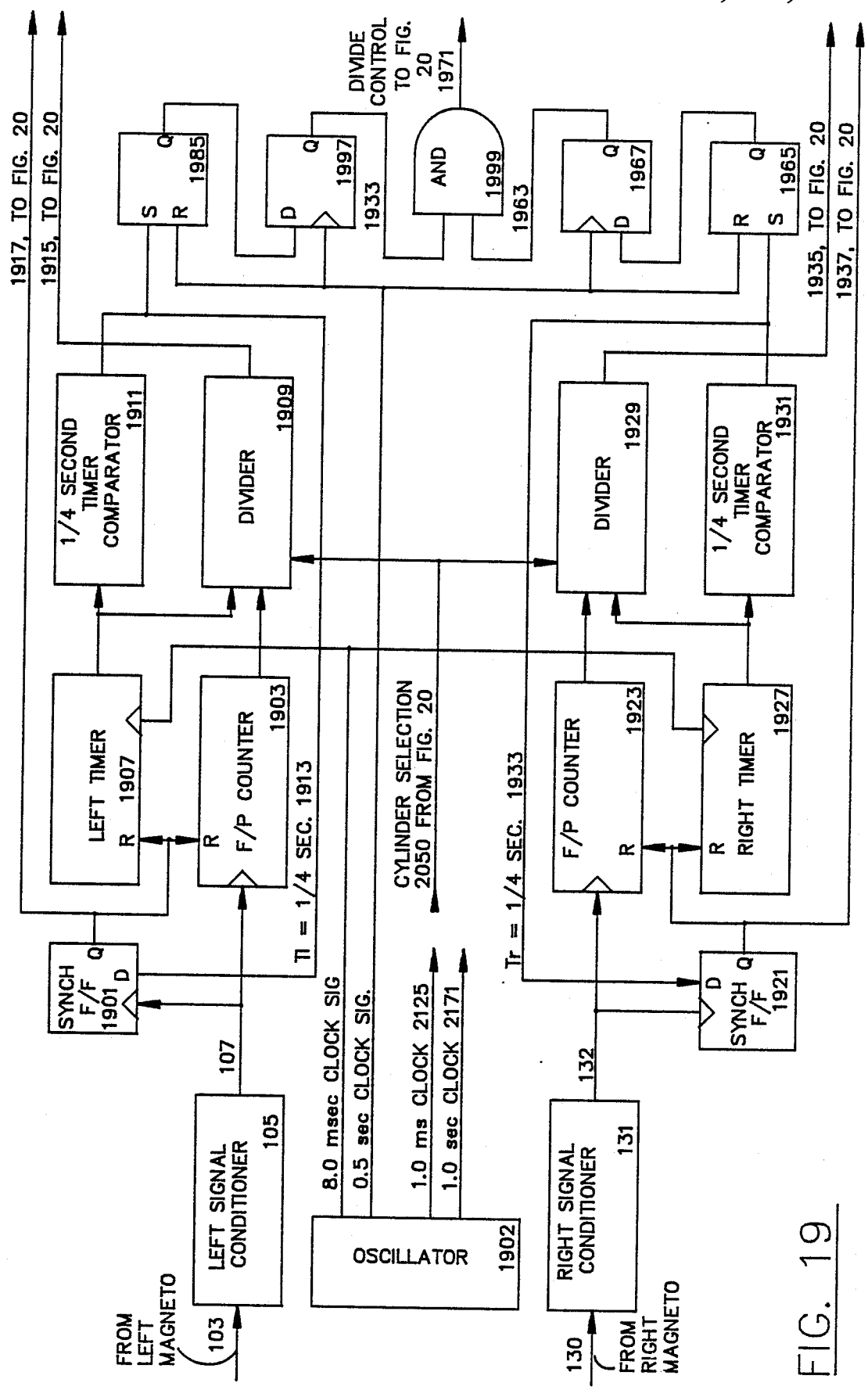
FIGS. 19, 20 and 21 when taken together, make up a functional block diagram or a discrete component embodiment of the tachometer of the present invention.
Figure 20:
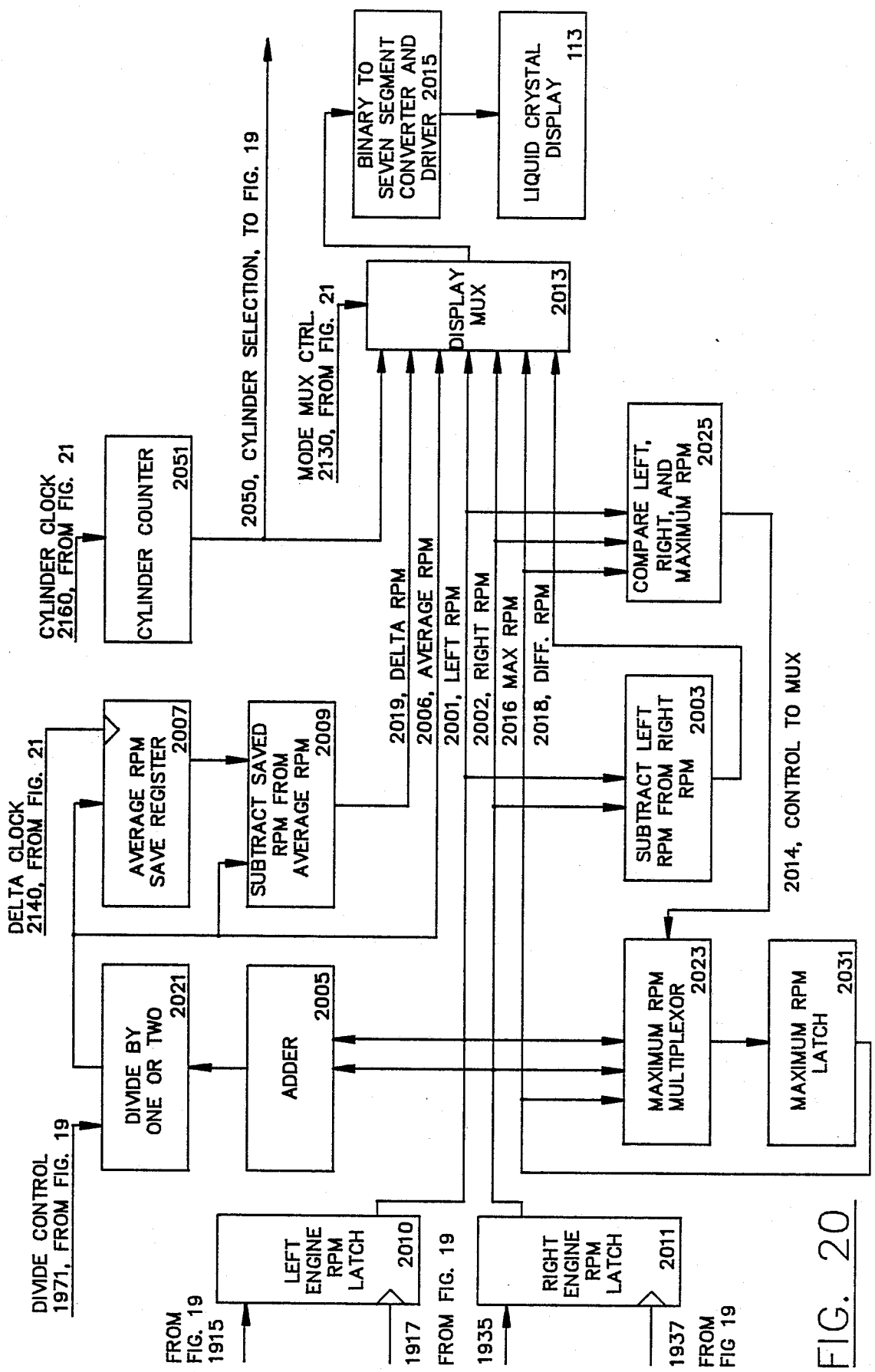
Figure 21:
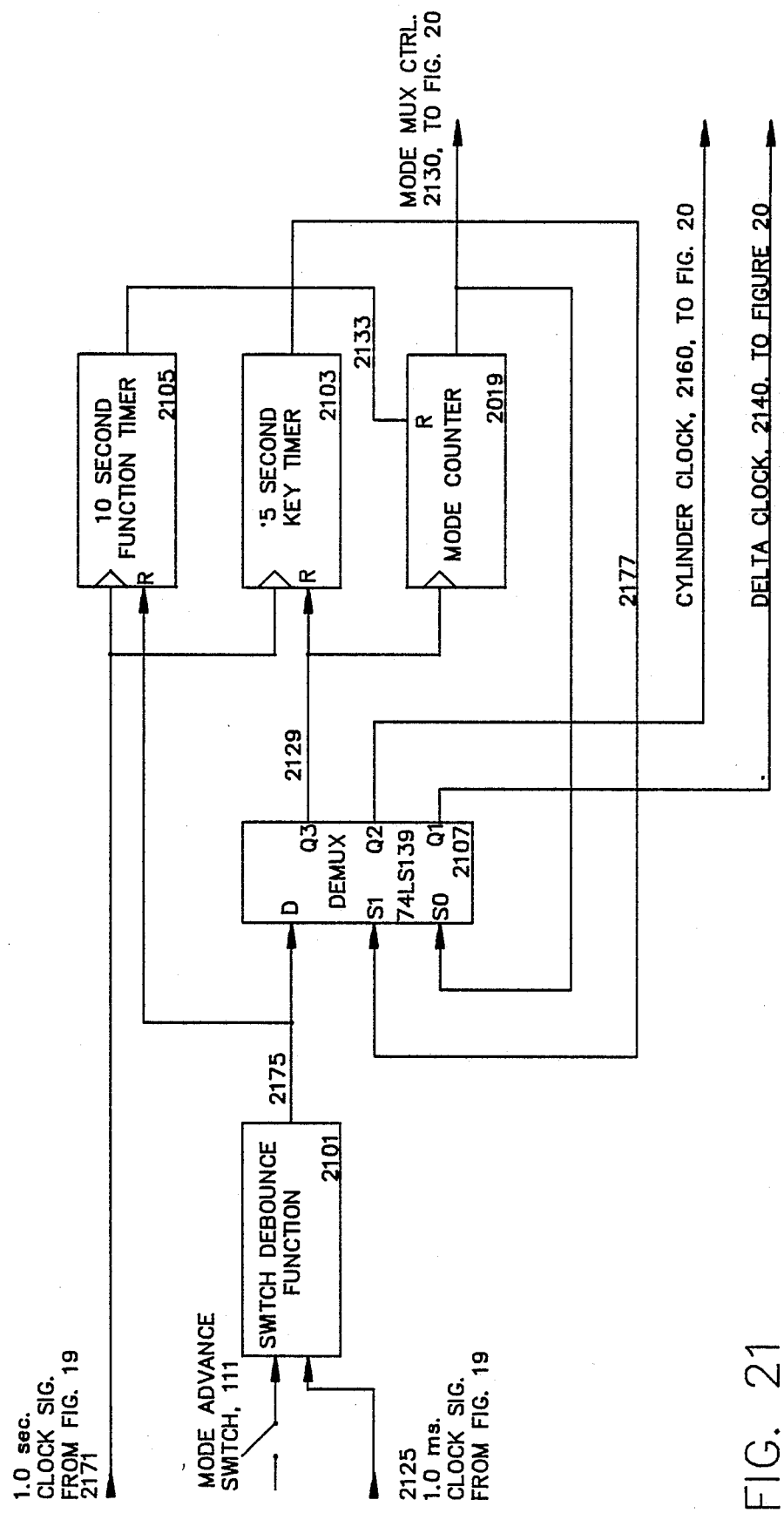

FIGS. 19, 20 and 21 show the functional block circuit for providing all of the various tachometer mode displays on display 2017 (FIG. 20) under control of MODE ADVANCE SWITCH 111 (FIG. 21).

In FIG. 19, the left magneto firing pulses appear on input lead 103 to the LEFT SIGNAL CONDITIONER 105. A suitable circuit for this conditioner has been described in connection with FIG. 2. The corresponding firing pulse train, after conditioning, appears on lead 107 for clock F/P COUNTER 1903 and to the clock input for the D SYNC F/F 1901. OSCILLATOR 1902 provides a continuous 8 microsecond clock signal for application to LEFT TIMER 1907 on its clock input.

In operation, assume that ¼ SEC TIMER COMPARATOR 1911, output 1913, Tl, is "on" thus, providing a high or extended pulse to the D input of SYNC F/F 1901. When a firing pulse arrives from the LEFT SIGNAL CONDITIONER 105, at the clock input of SYNC F/F 1901, the high Tl is copied to the Q output of F/F 1901 to reset the LEFT TIMER 1907, reset the firing pulse COUNTER then proceed to FIG. 20, via lead 1917, to latch the LEFT RPM from lead 1917 into the LEFT ENGINE RPM LATCH, 2010. Resetting the LEFT TIMER, 1907, will result in the removal of the assumed "on" condition at the input of SYNCH F/F 1901. The next firing pulse will then remove the reset from the LEFT TIMER and left F/P COUNTER allowing them to time and count subsequent firing pulses. The F/P COUNTER 1903 counts each conditioned firing pulse appearing on lead 107 until the ¼ SEC TIMER COMPARATOR 1911 determines that the LEFT TIMER, clocked in 8 usecs intervals by oscillator 1902, has measured ¼ second from the first pulse counted by F/P COUNTER 1903. Note that counting and timing are synchronized with each other via the SYNCH F/F output 1917 and each starts and stops on a firing pulse because lead 1917 can only be changed by a firing pulse.

As LEFT TIMER 1907 approaches ¼ second, the ¼ SEC TIMER COMPARATOR 1911 applies a high signal to the D input to the SYNC F/F 1901 and the very next pulse from the LEFT SIGNAL CONDITIONER 105 provides a high "clock" pulse to the SYNC F/F 1901 to cause Q to go high to reset COUNTER 1903 and LEFT TIMER 1907.

Thus, it will be noted that if the LEFT SIGNAL CONDITIONER pulse to SYNC F/F 1901 occurred exactly at the end of the ¼ second, then signal 1917 resets COUNTER 1903 and LEFT TIMER 1907, clocks calculated rpm into LEFT ENGINE RPM LATCH 2010, and it is known that an integral number of firing pulses had been received during the prior ¼ second. However, usually the ¼ second interval will expire and it is necessary to obtain one further count or firing pulse from LEFT SIGNAL CONDITIONER 105 and then provide the extended time to DIVIDER 1909. Thus, LEFT TIMER 1907 and F/P COUNTER 1903 are fed to DIVIDER 1909 for determination of the LEFT ENGINE RPM which is subsequently sent to LEFT ENGINE RPM LATCH, via lead 1915. Note that the DIVIDER 1909 requires the information of how many cylinders there are in the engine being monitored to provide the correct RPM information. This information is supplied from FIG. 20 block 2051, CYLINDER SELECTION, over lead 2050.

In the identical same manner, the RIGHT ENGINE RPM LATCH 2011 of FIG. 20 receives the RIGHT RPM, calculated by DIVIDER 1929 from data supplied by F/P COUNTER 1923 and RIGHT TIMER 1927, via lead 1935 and latches it when signaled by 1937, as a result of firing pulses received from the engine's right magneto over lead 130 to RIGHT SIGNAL CONDITIONER 131 which supplies the firing pulse train over lead 132 for operation of F/P COUNTER 1923 under control of SYNC F/F 1921. Signal 1937, from SYNC F/F 1921, resets the RIGHT TIMER 1927 and F/P COUNTER at the end of the sampling period determined by the ¼ SEC TIMER COMPARATOR 1931 from data supplied by the RIGHT TIMER 1027. Divider 1929 is supplied engine cylinder data over lead 2050 from CYLINDER SELECTION 2051 of FIG. 20.

Block 1902 is an oscillator circuit providing timing pulses to various other circuits in the example tachometer. The 8.0 microsecond clock operates the LEFT and RIGHT timers at sufficient frequency to provide timing accurate enough for the RPM precision needed by the pilot.

FLIP FLOP blocks 1985 and 1965 form a left and right missing firing pulse detector whose outputs are set true when Tl on lead 1913 (FIG. 19) and Tr on lead 1933 (FIG. 19) become active indicating the completion of an RPM sample. Under normal conditions, Tl and Tr should occur approximately every ¼ second, otherwise the Q outputs of FLIP FLOPS 1985 and 1965 will be turned off within ½ second, as clocked by block 1902, causing FLIP FLOPS 1997 and 1967 to copy zeros to AND GATE 1999, via leads 1933 and 1963. AND GATE 1999 sets the DIVIDE CONTROL 1971 off if either Magneto is not supplying firing pulses and is used to adjust the generation of AVERAGE RPM at block 2021 for a missing RPM sample.

It should be noted that both sampling circuits need not be operated simultaneously to obtain an RPM reading, i.e. an input lead such as 103 or 130 may be disconnected from a magneto and the other lead will supply sufficient information to generate it's RPM and an identical AVERAGE RPM. For practical purposes, consider the RPM of the disconnected lead and related circuitry to be zero when using the various modes of tachometer operation.

The purpose of the structure of FIG. 20 is to provide the desired calculations of LEFT RPM and RIGHT RPM and multiplex the resulting information for selective display at LIQUID CRYSTAL DISPLAY 113. Accordingly, the left engine (or magneto) RPM is available at lead 2001 from LEFT ENGINE RPM LATCH 2010 and RIGHT RPM is available on input lead 2002 from the RIGHT ENGINE LATCH 2011. Leads 2001 and 2002 distribute LEFT RPM and RIGHT RPM to DISPLAY MUX 2013, block 2003 SUBTRACT LEFT RPM FROM RIGHT RPM for DIFFERENCE MODE, block 2005 ADDER for AVERAGE RPM, block 2025 COMPARE LEFT, RIGHT, AND MAXIMUM RPM for MAXIMUM RPM, and block 2023 MAXIMUM RPM MULTIPLEXOR.

Block 2005 provides the addition of the LEFT RPM and RIGHT RPM as a step in determining the AVERAGE RPM. The sum is presented to programmable divider 2021 where divide control 1971 controls wether to divide the sum by one or two to provide corrected AVERAGE RPM which is distributed via lead 2006 to block 2013, block 2007, and block 2009.

Block 2003, SUBTRACT LEFT RPM FROM RIGHT RPM, provides the results of DIFFERENCE MODE across lead 2018 to block 2013 for selection to the display.

Block 2007, AVERAGE RPM SAVE REGISTER, saves AVERAGE RPM for future reference whenever MODE ADVANCE SWITCH 111 is closed and DELTA MODE is selected by the pilot, as indicated by the DELTA CLOCK lead 2140, from FIG. 21.

BLOCK 2009, SUBTRACT SAVED RPM FROM AVERAGE RPM, subtracts the prior stored AVERAGE RPM in block 2007 from the current AVERAGE RPM and transmits the difference over lead 2019 to block 2013 for selection to the display.

Block 2025, COMPARE LEFT, RIGHT, AND MAXIMUM RPM, is a comparator that will supply a control signal, 2014, to MAXIMUM RPM MULTIPLEXOR 2023 to route the greatest value of RIGHT RPM, LEFT RPM, or the current MAX RPM to the MAX RPM LATCH 2031. The new MAX RPM output of block 2031 is presented on lead 2016 to block 2013 for presentation to the display and is also sent back to the comparator, 2025, and the multiplexor 2023 so that it may be compared with the next set of LEFT RPM and RIGHT RPM values.

Block 2051, CYLINDER COUNTER, is a circular counter that increments the number of cylinders in the engine each time lead 2160, CYLINDER CLOCK, from FIG. 21 clocks it during CYLINDER SELECT MODE. Lead 2050 presents the selected number of cylinders to block 2013, and to the DIVIDERS block 1909 and block 1929 on FIG. 19 for use in calculating RPM.

The purpose of multiplexer 2013 is to select the values for display by a BINARY TO SEVEN SEGMENT CONVERTER AND DRIVER 2015 at LIQUID CRYSTAL DISPLAY 113. It should be noted that DISPLAY MUX 2013 is controlled by lead 2130, MODE MUX CTRL, which comes from FIG. 21, the output of MODE COUNTER 2019. Hence MODE ADVANCE SWITCH 111 selects the parameters to be displayed via the apparatus and circuitry of FIG. 21.

Referring to FIG. 21, when either the pilot or the maintenance man leaves the tachometer alone for ten seconds, allowing the internal function timer, 2105, to expire, or powers on the tachometer, the tachometer reverts to mode zero, via reset signal 2133. The following chart shows the functions performed in each mode, and the sequence that those mode will be selected by consecutive depressions of MODE ADVANCE SWITCH 111:

| Mode 0 | Display or Toggle Right and Left RPM |
| Mode 1 | Display Delta Mode |
| Mode 2 | Display Max RPM |
| Mode 3 | Display Average RPM |
| Mode 4 | Select Cylinder |
| Mode 5 | Display Difference of Right and Left RPM |

Left RPM

In operation, when the pilot desires to select a mode of operation other than zero, closure of MODE ADVANCE SWITCH 111 (FIG. 21) is gated through DEBOUNCE 2101 to 10 SECOND FUNCTION TIMER 2105, via lead 2175, and DE-MUX 2107 to increment MODE COUNTER 2019 via output lead 2129 and restart 5 second timer 2103. The SWITCH DEBOUNCE FUNCTION is operated via clock 2125 to guarantee that switch bouncing does not cause false pulses to appear on signal 2175.

Successive closures of switch 111 before the expiration of the FIVE SECOND TIMER 2103 will restart the TIMER 2103 and increment the MODE COUNTER 2019. Allowing the FIVE SECOND TIMER 2103 to time out by not closing switch 111 will cause the FIVE SECOND TIMER 2103 to instruct the DE-MUX 2107 via lead 2177 to route switch information to leads 2140 or 2160 if either DELTA MODE or CYLINDER SELECT MODE have been selected in mode counter 2019. Lead 2140 controls the AVERAGE RPM SAVE REGISTER, 2007, while DELTA MODE is selected, and lead 2160 controls the CYLINDER COUNTER, 2051, while in CYLINDER SELECT MODE.

Each time switch 111 is closed, the TEN-SECOND FUNCTION TIMER 2105 is reset, allowing the selected function to operate for ten seconds from the last switch closure. Expiration of the FUNCTION TIMER 2105 will reset the MODE COUNTER 2019 to mode zero, causing the DE-MUX 2107, via lead 2130 to again pass switch 111 information to FIVE SECOND TIMER 2103 and MODE COUNTER 2019 via lead 2129. Lead 2171 supplies the one second clock signal time base to operate the two timers 2103 and 2105 while the lead 2125 applies a 1.0 millisecond clock signal to operate the DEBOUNCE CIRCUIT 2101.

Note also that a selected mode may have it's function timer suspended by the pilot holding MODE ADVANCE SWITCH 111 closed indefinitely.

Figure 24:
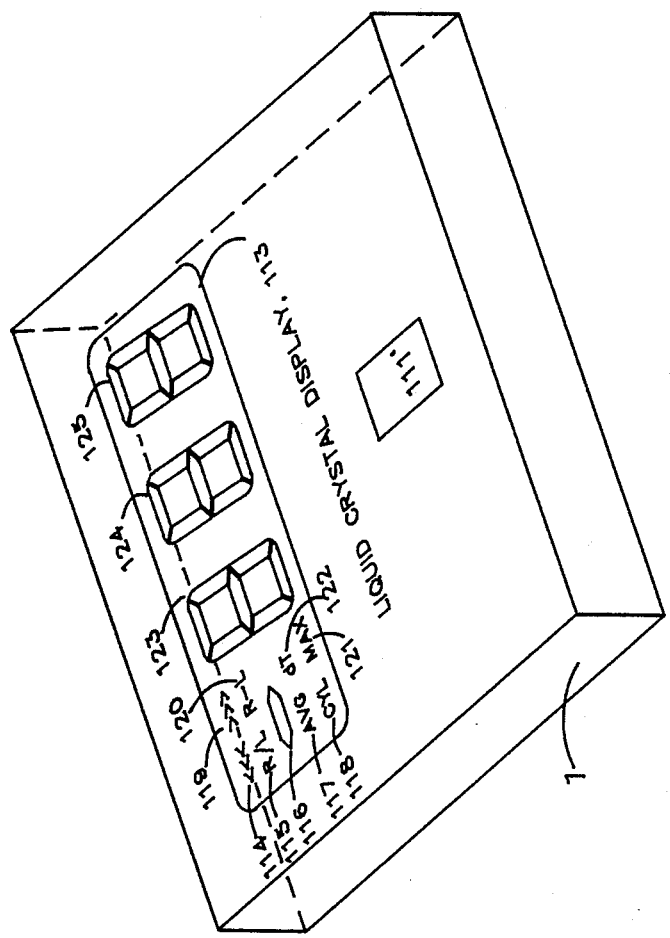

Referring to FIG. 24, the housing 1 is of a size selected to the palm of the average human hand allowing the pilot's thumb to be positioned over the top of the housing to operate MODE ADVANCE SWITCH 111'. LIQUID CRYSTAL DISPLAY 113 is located in the top of the housing 1 where it is viewed through a cut-out in the top of housing 1. Enclosed within housing 1 are optional batteries, circuit boards with accompanying components, and wireharness 101 exits through a strain relief hole in a surface of the housing.

I claim:

1. A tachometer for independently determining and displaying revolutions per minute for the right and left magnetos for multi-cylinder engines employing dual engine ignition systems, each respective engine under test having a predetermined number of cylinders comprising in combination:

microprocessor means;

circuit means electrically coupled to said right magneto and said left magneto for sensing, scaling and providing right magneto pulses and left magneto pulses, said right and left magneto pulses corresponding in time with respective right and left magneto firing pulses to engine spark plugs, said magneto pulses are compatible with the requirements of said microprocessor means;

switch means for selecting and providing an integer representing the NUMBER OF CYLINDERS used by each respective engine to said microprocessor;

means for determining a right magneto sample period of time having an integer number of pulses, said right magneto sample period is designated as the RIGHT MAGNETO PERIOD TIME and for counting said right magneto pulses to obtain an integer value of RIGHT COUNTED PULSES for the right magneto sample period;

said right magneto sample period starting with the occurrence of a right magneto firing pulse from the right magneto and terminating upon the occurrence of the first right magneto firing pulse from the right magneto occurring at or beyond 250 milliseconds from the beginning of said right magneto sample period;

means for determining a left magneto sample period of time having an integer number of pulses, said left magneto sample period is designated as the LEFT MAGNETO PERIOD TIME and for counting said left magneto pulses to obtain an integer value of LEFT COUNTED PULSES for the left magneto sample period;

said left magneto sample period starting with the occurrence of a left magneto firing pulse from the left magneto and terminating upon the occurrence of the first left magneto firing pulse from the left magneto occurring at or beyond 250 milliseconds from the beginning of said left magneto sample period; and said microprocessor means responsive to the NUMBER OF CYLINDERS, LEFT MAGNETO PERIOD TIME, LEFT COUNTED PULSES, RIGHT MAGNETO PERIOD TIME, and RIGHT COUNTED PULSES for independently calculating right and left revolutions per minute from the equation:

LEFT REVOLUTIONS PER MINUTE =

$$\frac{(240,000,000/\text{NUMBER OF CYLINDERS})}{(\text{LEFT MAGNETO PERIOD TIME}/\text{LEFT COUNTED PULSES})}$$

and,

RIGHT REVOLUTIONS PER MINUTE =

$$\frac{(240,000,000/\text{NUMBER OF CYLINDERS})}{(\text{RIGHT MAGNETO PERIOD TIME}/\text{RIGHT COUNTED PULSES})}$$

where 240,000,000 divided by NUMBER OF CYLINDERS is a pre-determined conversion constant used to compensate the calculation for variations in counted pulses resulting from differing engine cylinder counts, signal processing, and four stroke engine ignition characteristics; and means responsive to said microprocessor for displaying the digital value of said LEFT and RIGHT REVOLUTIONS PER MINUTE.

2. A tachometer for determining and displaying revolutions per minute for multi-cylinder engines, comprising:

means for determining a sample period of time during which occurs a number of engine signals indicative of the rotation of said engine;

said sample period starting with the occurrence of an engine signal and terminating upon the occurrence of the first engine signal occurring at or beyond 250 milliseconds from the beginning of said sample period;

means for counting the engine signals, in said sample period; and, microprocessor means;

switch means for selecting and providing a integer value representing the NUMBER OF CYLINDERS used by each respective engine to said microprocessor;

said microprocessor means programmed for calculating revolutions per minute from the equation:

$$\text{Revolutions per minute} = \frac{(\text{A Predetermined conversion constant})/\text{NUMBER OF CYLINDERS}}{(\text{Sample period})/(\text{Counted pulses})}$$

where the pre-determined conversion constant is used to compensate the calculation for variations in counted pulses resulting from differing engine cylinder counts, signal processing, and four stroke engine ignition characteristics; and display means for displaying the value of said calculated Revolutions per minute.

3. A method for determining revolutions per minute for multi-cylinder engines, comprising the steps of:

A. selecting a value for the NUMBER OF CYLINDERS based on the number of cylinders on said multicylinder engine;

B. determining a sample period of time during which occurs a number of engine signals indicative of the rotation of said engine; said sample period starting with the occurrence of said engine signals and terminating upon the occurrence of the first engine signal occurring at or beyond 250 milliseconds from the beginning of said sample period;

C. counting the number of said engine signals during said sample period; and,

D. calculating revolutions per minute from the equation:

$$\text{Revolutions per minute} = \frac{(\text{A Predetermined conversion constant})/\text{NUMBER OF CYLINDERS}}{(\text{Sample period})/(\text{Counted pulses})}$$

where said pre-determined conversion constant is used to compensate the calculation for variations in counted pulses resulting from differing engine cylinder counts, signal processing, and four stroke engine ignition characteristics;

E. displaying the value of said calculated Revolutions per minute on a digital readout; and F. repeating steps B, C, D and E.

4. A tachometer for determining engine RPM for a piston powered engine, said tachometer comprising in combination:

microprocessor means;

switch means for selecting and providing a integer value representing the NUMBER OF CYLINDERS used by said piston powered engine to said microprocessor means;

means for developing a pulse train having a pulse for each piston power stroke, said pulses are spaced apart in accordance with the firing times of successively fired cylinders;

means for determining a pre-determined time interval beginning with a pulse initiating the power stroke of a piston;

means for counting the number of pulses occurring during said pre-determined time interval;

means for measuring the sample time interval between the time of occurrence of said initiating pulse, being of a minimum pre-determined period of time, and extended until the next pulse received thereafter; and microprocessor means using said sample count, sample time and a predetermined conversion constant K to calculate the value of the RPM of the engine supplying the pulse train from the following formula:

RPM=K/(SAMPLE TIME/SAMPLE COUNT)

using K=60,000,000 for a four cylinder engine, 40,000,000 for a six cylinder engine and 30,000,000 for a eight cylinder engine;

where K is a pre-determined conversion constant used to compensate the calculation for variations in counted pulses resulting from differing engine cylinder counts, signal processing, and four cycle engine ignition characteristics;

the value of said SAMPLE TIME is measured in microseconds and the value of SAMPLE COUNT is the number of firing pulses received during a period of sample time; and display means for displaying the value of said calculated RPM.

* * * * *